United States Patent [19]
Scheffer et al.
[11] Patent Number: 4,525,794
[45] Date of Patent: Jun. 25, 1985

[54] ELECTRONIC BALANCE

[75] Inventors: Daniel G. Scheffer, Montville; Christopher W. Brock, Whippany; Douglas B. Schumer, Middletown, all of N.J.

[73] Assignee: Ohaus Scale Corporation, Florham Park, N.J.

[21] Appl. No.: 399,647

[22] Filed: Jul. 16, 1982

[51] Int. Cl.[3] ...................... G06F 15/20; G01G 13/14
[52] U.S. Cl. ........................................ 364/567; 177/25
[58] Field of Search .................... 364/466, 567; 177/1, 177/25

[56] References Cited

U.S. PATENT DOCUMENTS

| | | | |
|---|---|---|---|
| Re. 28,706 | 2/1976 | Dorey | 340/347 |
| 3,051,939 | 8/1962 | Gilbert | 340/347 |
| 3,074,496 | 1/1963 | Williams | 177/178 |
| 3,316,547 | 4/1967 | Ammann | 340/347 |
| 3,577,140 | 5/1971 | Aasnaes | 340/347 |
| 3,582,947 | 6/1971 | Harrison | 340/347 |
| 3,657,526 | 4/1972 | Konisi et al. | 235/151.33 |
| 3,678,506 | 7/1972 | Wheable | 340/347 |
| 3,709,309 | 1/1973 | Williams, Jr. et al. | 177/165 |
| 3,731,754 | 5/1973 | Godwin et al. | 177/165 |
| 3,789,937 | 2/1974 | Strobel et al. | 177/210 |
| 3,816,156 | 6/1974 | Baumann et al. | 177/15 |
| 3,847,238 | 11/1974 | Hall et al. | 177/255 |
| 3,860,802 | 1/1975 | Knothe et al. | 235/151.33 |
| 3,861,479 | 1/1975 | Pryor | 177/25 |
| 3,869,004 | 3/1975 | Gallo | 177/25 |
| 3,869,005 | 3/1975 | Williams, Jr. et al. | 177/25 |
| 3,872,936 | 3/1975 | Baumann et al. | 177/15 |
| 3,916,173 | 10/1975 | Williams, Jr. et al. | 235/151.33 |
| 3,937,287 | 2/1976 | Pryor et al. | 177/25 |
| 3,939,332 | 2/1976 | Williams, Jr. et al. | 235/151.33 |
| 3,962,569 | 6/1976 | Loshbough et al. | 235/151.33 |
| 3,962,570 | 6/1976 | Loshbough et al. | 235/151.33 |
| 3,984,667 | 10/1976 | Loshbough | 235/151.33 |
| 3,986,012 | 10/1976 | Loshbough et al. | 235/151.33 |
| 4,004,139 | 1/1977 | Hall | 235/151.33 |
| 4,022,063 | 5/1977 | West et al. | 374/158 |
| 4,034,818 | 7/1977 | Matilainen | 177/25 |
| 4,036,316 | 7/1977 | Rock | 177/1 |
| 4,043,412 | 8/1977 | Rock | 177/25 |
| 4,081,801 | 3/1978 | Thomas et al. | 340/347 |
| 4,084,242 | 4/1978 | Conti | 364/466 |
| 4,103,750 | 8/1978 | Melcher et al. | 177/1 |
| 4,115,767 | 9/1978 | Brosh et al. | 340/347 |
| 4,131,946 | 12/1978 | Dlugos | 364/466 |
| 4,137,568 | 1/1979 | Dlugos | 364/734 |
| 4,139,069 | 2/1979 | Domis et al. | 177/1 |
| 4,139,070 | 2/1979 | Hanson et al. | 177/200 |
| 4,143,724 | 3/1979 | Itani | 177/25 |
| 4,153,122 | 5/1979 | Engels et al. | 177/25 |
| 4,156,472 | 5/1979 | Kunz | 177/25 |
| 4,157,738 | 6/1979 | Nishiguchi et al. | 177/1 |
| 4,158,396 | 6/1979 | Suzuki et al. | 177/210 |
| 4,159,521 | 6/1979 | Hall et al. | 364/466 |
| 4,251,874 | 2/1981 | Check, Jr. | 364/466 X |
| 4,271,481 | 6/1981 | Check, Jr. et al. | 364/900 |
| 4,326,254 | 4/1982 | Uchimura et al. | 364/466 |
| 4,328,874 | 5/1982 | Gumberich et al. | 177/25 |
| 4,330,837 | 5/1982 | Itani | 364/567 |
| 4,347,903 | 9/1982 | Yano et al. | 177/25 |
| 4,351,033 | 9/1982 | Uchimura et al. | 364/466 X |
| 4,363,370 | 12/1982 | Sarkison | 177/210 |
| 4,419,734 | 12/1983 | Wolfson et al. | 364/567 |
| 4,422,148 | 12/1983 | Soderberg et al. | 364/900 X |

FOREIGN PATENT DOCUMENTS 1000132 8/1965 United Kingdom .

OTHER PUBLICATIONS

Andreas Antoniou, *Digital Filters: Analysis and Design*, McGraw-Hill, 1979, (pp. 38-41, 76-77).

*Primary Examiner*—Edward J. Wise
*Attorney, Agent, or Firm*—Robert R. Jackson; David W. Plant

[57] ABSTRACT

An electronic balance having a strain gauge transducer. The analog output signal of the transducer is processed digitally so that the displayed weight is based on several successive digitized analog signal samples. Various operating parameters (e.g., conversion factors for several different units of weight) are stored in a non-volatile memory so that the scale can perform various weighing functions. The scale has a parts counter mode of operation requiring re-taring of the parts container whenever the scale is recalibrated for a different individual part weight.

8 Claims, 19 Drawing Figures

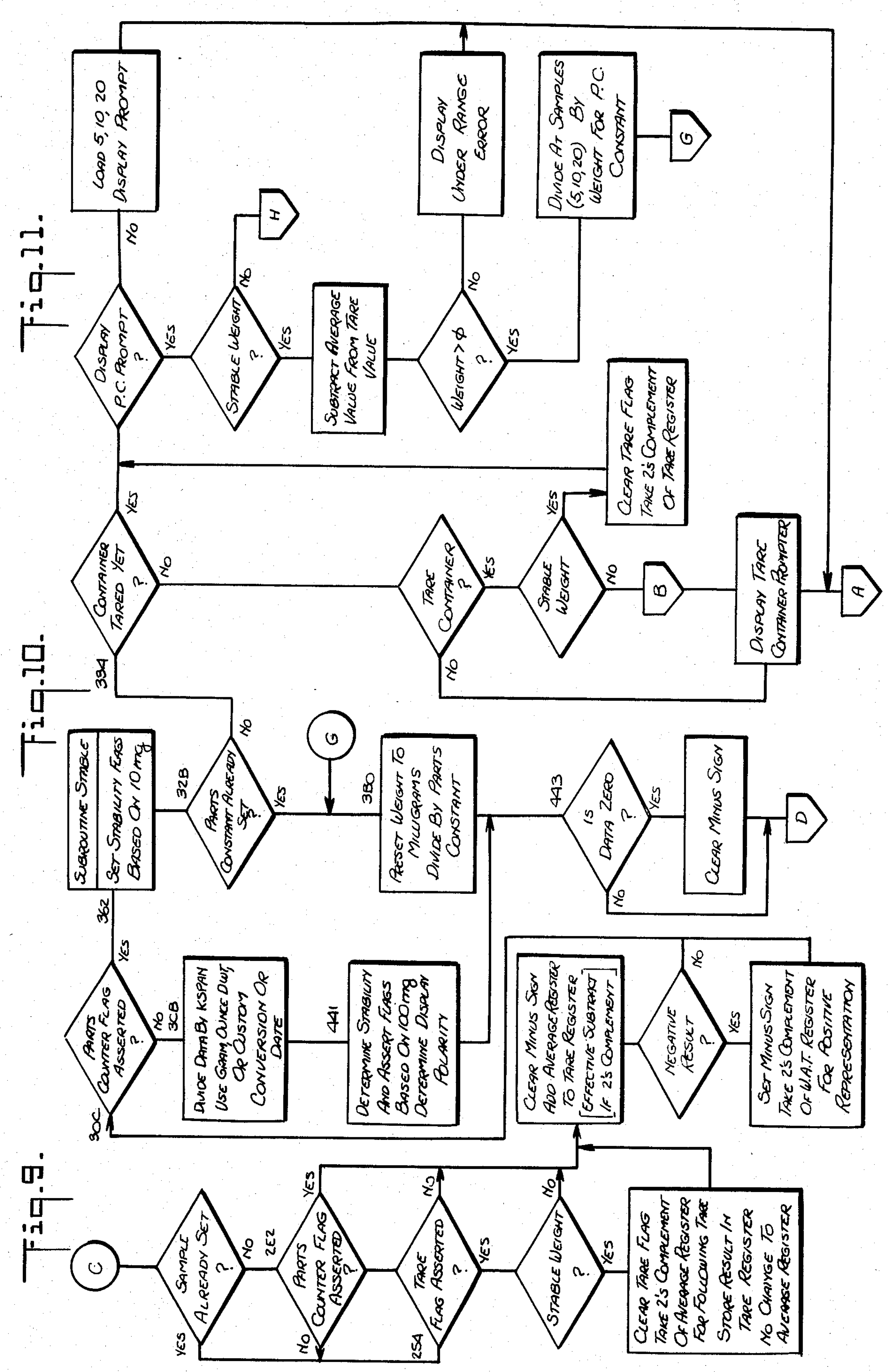
Fig. 9.
Fig. 10.
Fig. 11.
C
SAMPLE ALREADY SET ?
PARTS COUNTER FLAG ASSERTED ?
TARE FLAG ASSERTED ?
STABLE WEIGHT ?
CLEAR TARE FLAG TAKE 2's COMPLEMENT OF AVERAGE REGISTER FOR FOLLOWING TARE STORE RESULT IN TARE REGISTER NO CHANGE TO AVERAGE REGISTER
CLEAR MINUS SIGN ADD AVERAGE REGISTER TO TARE REGISTER (EFFECTIVE SUBTRACT IF 2's COMPLEMENT)
NEGATIVE RESULT ?
SET MINUS SIGN TAKE 2's COMPLEMENT OF W.A.T. REGISTER FOR POSITIVE REPRESENTATION
PARTS COUNTER FLAG ASSERTED ?
DIVIDE DATA BY KSPAN USE GRAM, OUNCE DWT, OR CUSTOM CONVERSION OR DATE
DETERMINE STABILITY AND ASSERT FLAGS BASED ON 100mg DETERMINE DISPLAY POLARITY
SUBROUTINE STABLE
SET STABILITY FLAGS BASED ON 10 mg
PARTS CONSTANT ALREADY SET ?
G
PRESET WEIGHT TO MILLIGRAMS DIVIDE BY PARTS CONSTANT
IS DATA ZERO ?
CLEAR MINUS SIGN
D
CONTAINER TARED YET ?
TARE CONTAINER ?
STABLE WEIGHT
B
DISPLAY TARE CONTAINER PROMPTER
A
CLEAR TARE FLAG TAKE 2's COMPLEMENT OF TARE REGISTER
DISPLAY P.C. PROMPT ?
LOAD 5, 10, 20 DISPLAY PROMPT
STABLE WEIGHT ?
H
SUBTRACT AVERAGE VALUE FROM TARE VALUE
WEIGHT > Φ ?
DISPLAY UNDER RANGE ERROR
DIVIDE AT SAMPLES (5,10,20) BY WEIGHT FOR P.C. CONSTANT
YES
NO
30C
36B
441
362
32B
38D
443
394
2E2
25A

ELECTRONIC BALANCE

BACKGROUND OF THE INVENTION

The present application pertains generally to the field of precision balances, and more particularly pertains to the field of electronic balances.

A precise, and yet relatively inexpensive, balance capable of providing a weight accurate, e.g., to one part per thousand, in a reasonably short time would be highly desirable.

SUMMARY OF THE INVENTION

The principal object of the present invention is to provide an electronic balance of relatively low cost and high precision.

Another object of the invention is to provide such a balance comprising a strain gauge transducer.

Another object of the invention is to provide such a balance capable of expressing a measured weight in any of several units, and capable of stabilizing the output with a precision that varies as a function of the units selected.

The present invention, in one aspect, is an electronic balance comprising a transducer, preferably a strain gauge, to generate an analog electrical signal representative of the weight being measured, an analog-to-digital converter to generate a series of digital signals representative of the information conveyed by the analog signal, and a filter capable of filtering a portion of the series of digital signals at once. This permits one portion of the data obtained during the measurement of a weight to be processed digitally while a later-obtained portion of the data is being converted from analog to digital form. The analog to digital conversion can be carried out with resolution less that what would be necessary to obtain the desired precision if the final output of the balance were derived from a single portion of the data only.

In another aspect, the present invention is an electronic balance having a non-volatile memory in which are stored conversion factors for converting processed data into weights expressed in any of several conventional units (grams, ounces, carats, etc.). The units in which a particular balance can express weights are selected permanently in the factory from among those for which conversion factors are stored in the memory, e.g., by means of a logic mask. Alternatively, the memory may store general sets of constants necessary for analyzing the data, the sets corresponding respectively to different full-scale ranges (e.g., 300 grams versus 3,000 grams), the set appropriate for the particular balance being selected in the factory.

In yet another aspect, the present invention is an electronic balance operable in a parts counter mode, in which the balance is tared while a container that is to be used to contain the sample is on the balance pan, an initial sample consisting of a specified number of uniform pieces is weighed in the container to determine unit weight, and a sample consisting of an unknown number of such pieces is weighed in the container, the balance then displaying the number of pieces in the sample. According to this aspect of the invention, the balance is disabled from making any measurements while in the parts counter mode until after taring to compensate for the container weight. If the balance is then recalibrated with another sample consisting of a different specified number of pieces from the sample previously used, the balance must again be tared to compensate for the weight of the container before any additional measurements can be made to prevent zero-drift errors.

Many other objects and features of the present invention will become clear upon consideration of the following description of one preferred embodiment, taken in conjunction with the accompanying figures, in which like reference characters refer to like elements throughout.

BRIEF DESCRIPTION OF THE FIGURES

FIGS. 5–17 are flow charts illustrating the software used in conjunction with the circuitry of FIGS. 1–4.

DETAILED DESCRIPTION OF THE PREFERRED EMBODIMENT

Figure 1:
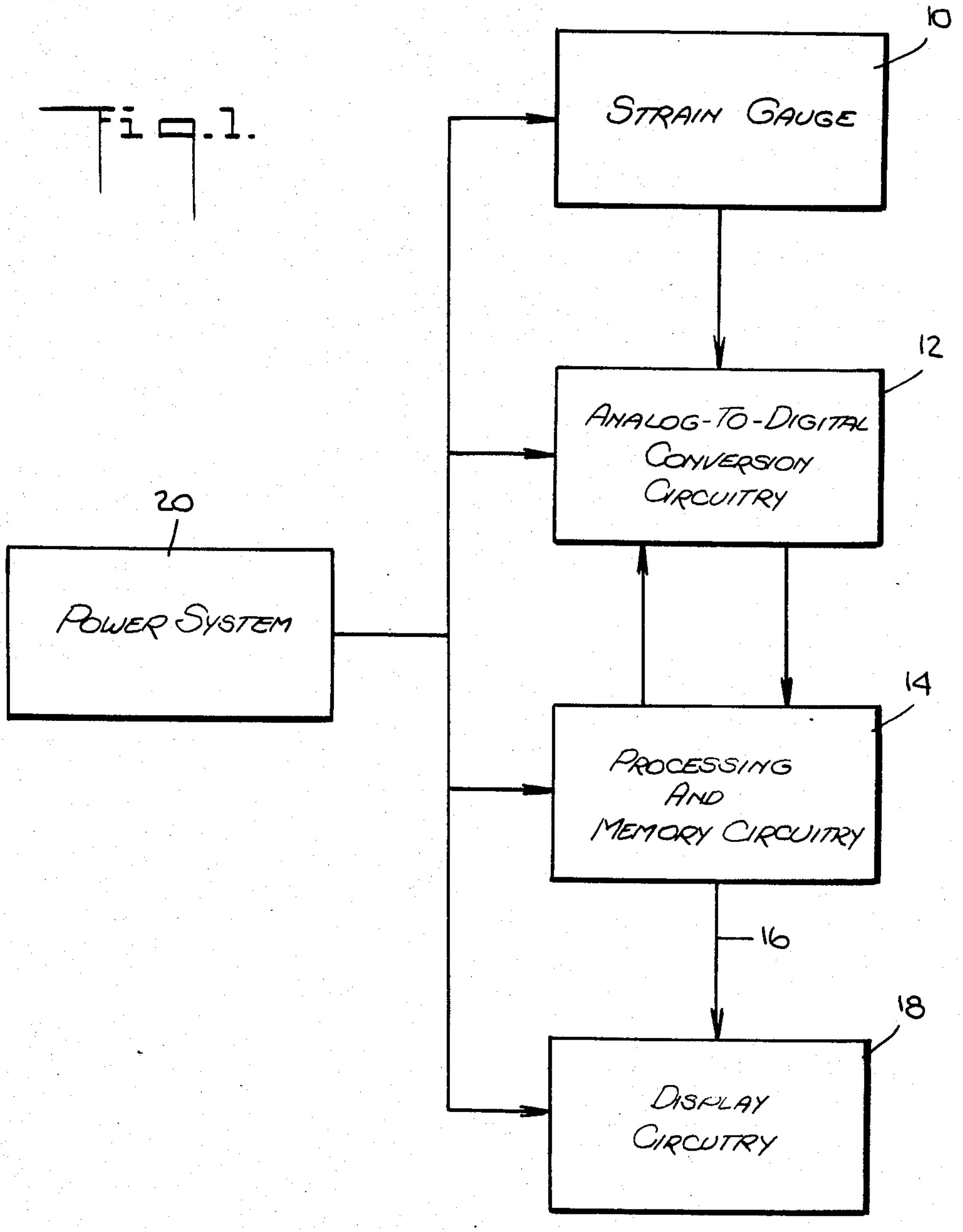
FIG. 1 is a schematic block diagram of the balance of the invention.

The general arrangement of the balance of the invention is indicated schematically in FIG. 1. The balance includes a strain gauge 10 of a known type, which produces an electrical signal representative of the stress on the strain gauge, which in turn is representative of the weight load on the strain gauge. The strain gauge output signal varies approximately linearly with the weight load on the strain gauge, which is the sum of the weight of the balance pan (not shown), the weight of the sample on the pan and the weight of the container, if any, holding the sample. The strain gauge output signal is herein assumed to vary exactly linearly with the weight, although some means for compensating for the actual slight non-linearity of this relation could be used, if desired, to improve the precision of the balance still further.

The signal output by the strain gauge is converted to a digital signal by means of analog-to-digital conversion (hereinafter "ADC") circuitry 12. The resulting digital signal is processed by processing circuitry 14 to produce electrical signals (indicated collectively by arrow 16) that drive a display unit 18 to display the weight of an object on the balance pan. The processing circuitry 14 includes a microprocessor, although it is to be understood that the invention could be practiced using hardware instead of the software disclosed herein. The balance also includes power supply circuitry 20 to provide the DC voltages required by circuits 12, 14 and 18.

Figure 2:
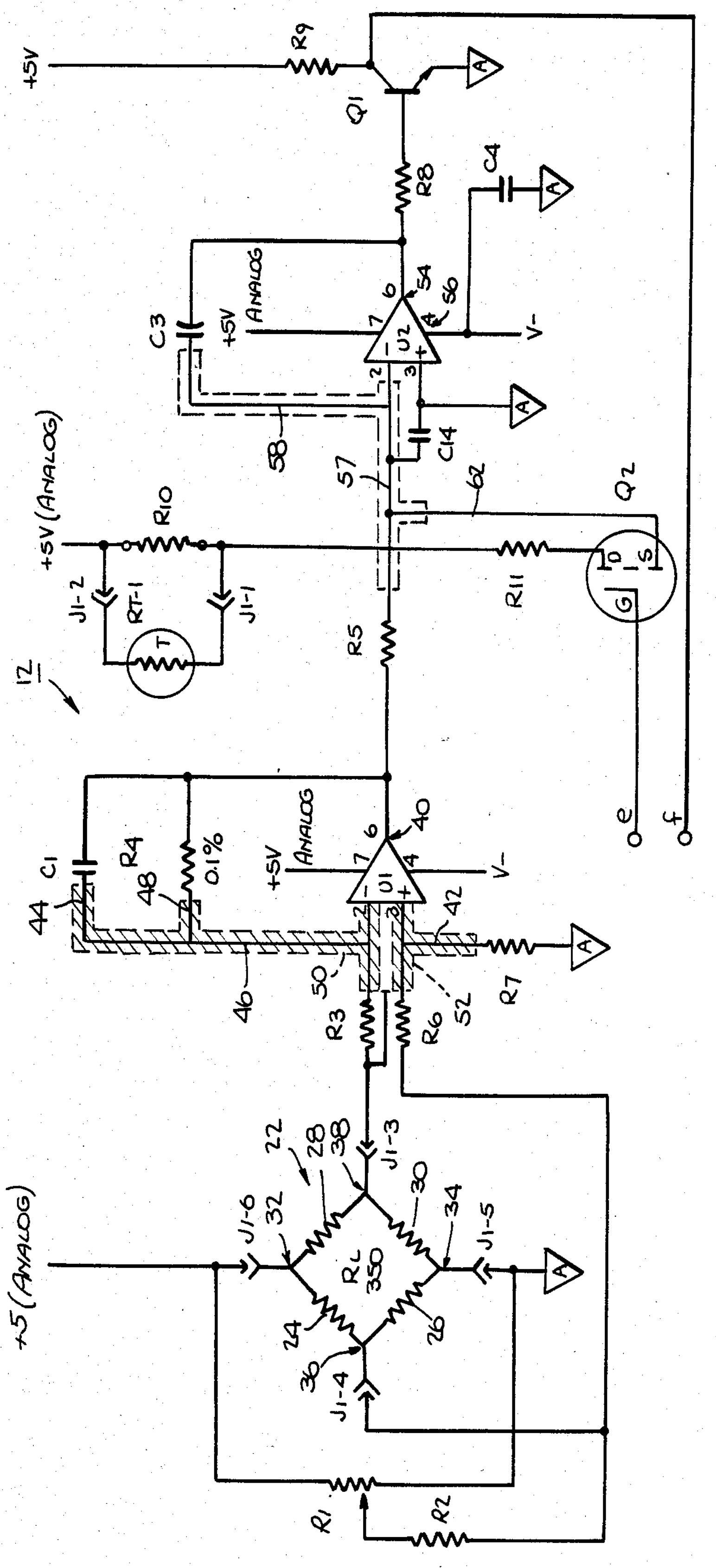
FIG. 2 is a schematic diagram of the analog-to-digital conversion circuitry indicated in FIG. 1.

The strain gauge 10 is a conventional device comprising a four-arm resistive bridge 22 (see FIG. 2) mounted on a frame that has the form of a parallelogram disposed in a vertical plane and including upper and lower parallel beams that are horizontal when the balance is in its equilibrium position. Two of the four resistors of the bridge 22 are mounted on each of the beams in such a manner that the four resistors 24, 26, 28, 30 define a rectangle when the strain gauge is unstressed. One end of the strain gauge is mounted securely to the frame of the balance. The pan of the scale is arranged so that the weight of the sample tends to shear the strain gauge downward about the connection of the strain gauge to the balance frame. This deflection creates strains in the four resistors 24, 26, 28, 30, but the resistors, because of their different locations, are not equally stressed. The changes in the resistance of the resistors 24, 26, 28, 30 resulting from the stress are therefore unequal. If the bridge 22 is so balanced electrically as to produce an output signal nearly equal to zero (i.e., no substantial difference in voltage between junctions 36 and 38) when the pan is empty, placement of a weight on the pan will cause the bridge 22 to generate a detectable output signal. The use of a strain gauge frame having the shape of a parallelogram tends to make the exact placement of a weight on the pan less important to the accuracy of the weight measurement, as is well known.

The four resistors 24, 26, 28, 30 are connected in the form of a parallelogram, with a constant 5-volt potential applied across two opposite vertices 32, 34 of the square. In the unloaded condition, the voltage at the third vertex 36 is adjusted to a voltage of value V1 by means of a resistive voltage divider comprising potentiometer R1 and fixed resistors R2, R6 and R7, and connected between the 5-volt analog source and analog ground. The voltage at the connection between resistors R6 and R7 is applied to the non-inverting input of an operational amplifier "OP AMP" hereinafter) U1. The voltage V2 at the fourth vertex 38 of the bridge 22 is applied via resistor R3 to the inverting input of OP AMP U1. The OP AMP U1 has a feedback network consisting of capacitor C1 and a resistor R4 connected in parallel with each other. The feedback network is connected between the inverting input and the output terminal 40 of OP AMP U1. The leads to both inputs of the OP AMP U1, the wire 42 connecting the non-inverting input lead and R7, and the conductors 44–48 connecting the inverting input to capacitor C1 and resistor R4 are guarded against leakage by being enclosed in respective conductive tracks 50, 52 on the printed circuit board bearing these leaks. The traces 50, 52, are connected to be at the voltage V2 of junction 38.

It will be clear to those skilled in the art that when a weight is placed on the pan, the deflection of the strain gauge causes V1 and V2 to shift in opposite directions from their equilibrium value, causing OP AMP U1 to output a signal proportional to the weight on the pan. The OP AMP U1, together with its feedback network and input resistors R3, R6 and R7, acts as a differential amplifier with negative gain, and acts also as an active low-pass filter (due to the presence of capacitor C1). The potentiometer R1 is permanently adjusted in the factory so that when no weight is on the pan, the output voltage of OP AMP U1 is near but not equal to zero.

The output terminal 40 of OP AMP U1 is connected across a resistor R5 to the inverting input of a second OP AMP U2. The inverting input of OP AMP U2 is also connected to analog ground across a capacitor C14. The non-inverting input of OP AMP U2 is grounded. OP AMP U2 has a feedback network consisting of capacitor C3, connected between the output terminal 54 and the inverting input of the OP AMP U2. The negative power supply terminal 56 of OP AMP U2, in addition to being connected to the negative voltage supply line, is also connected across capacitor C4 to analog ground. This circuit acts as an integrator, as described below.

A field effect transistor ("FET") Q2 is provided, having its source connected to the inverting input of OP AMP U2, its gate connected to three data bus terminals DB2-4 of the microprocessor U4 (see FIG. 3), and its drain connected across resistors R11 and R10 to the 5-volt analog supply. Transistor Q2 acts as a feedback switch for the integrator, as described below. A thermistor RT1 is connected in parallel with resistor R10 to provide temperature compensation.

The output of OP AMP U2 is applied across resistor R8 to the base of a bipolar junction transitor Q1, whose emitter is grounded and whose collector is connected via resistor R9 to the 5-volt DC source. The collector of transistor Q1 is also connected to the interrupt terminal INT of the microprocessor U4. Transistor Q1 serves as a comparator, outputting a signal only when the voltage at its base falls below a certain value.

The lead 57 connecting resistor R5 to the inverting input of OP AMP U2 is guarded against leakage as is the wire 58 connecting lead 57 and capacitor C3. A short length of the wire 62, which connects lead 57 to the source of transistor Q2, is also guarded. The guards comprise conductive traces on the printed circuit board carrying the ADC circuitry.

When the output of OP AMP U1 departs substantially from zero responsive to a weight on the pan, the output voltage of OP AMP U2 ramps up at a constant rate as charge is drawn from capacitor C3, producing a triangular wave as output. When the output voltage of OP AMP U2 rises above a certain value, transistor Q1 is turned on, lowering the voltage of the INT terminal of the microprocessor U4 from the high to the low state. At regular intervals (in the illustrated embodiment, approximately one millisecond), a timer, which in the embodiment shown is part of the microprocessor U4, turns FET Q2 on. This causes the 5-volt supply to recharge the integrator capacitor C3, in the process causing the integrator output voltage to ramp back down. When the output voltage of OP AMP U2 has ramped back down to a certain level, transistor Q1 turns off again, returning the signal of the INT terminal to the high state. The microprocessor then turns FET Q2 off. The length of time FET Q2 is on is directly proportional to the magnitude of the output signal of OP AMP U1, and therefore to the weight of the pan. A pulse-length counter in the microprocessor U4 measures the length of time FET Q2 is on. This information is used by the microprocessor U4 in a manner described below to determine the weight.

A small error is introduced, because the timer is operated by a clock and is therefore able to examine the signal being received from transistor Q1 only at discrete intervals. It will be apparent, however, that if one pulse ramps down too far (i.e., below the prescribed level), the ramp-up portion of the following pulse will not reach as high a level as would otherwise be the case, and the next pulse, to recharge the integrator to the prescribed level, will therefore be shorter. Errors of this kind are therefore non-cumulative, and by adding a large number of pulses together the total accuracy is actually improved.

Figure 3:
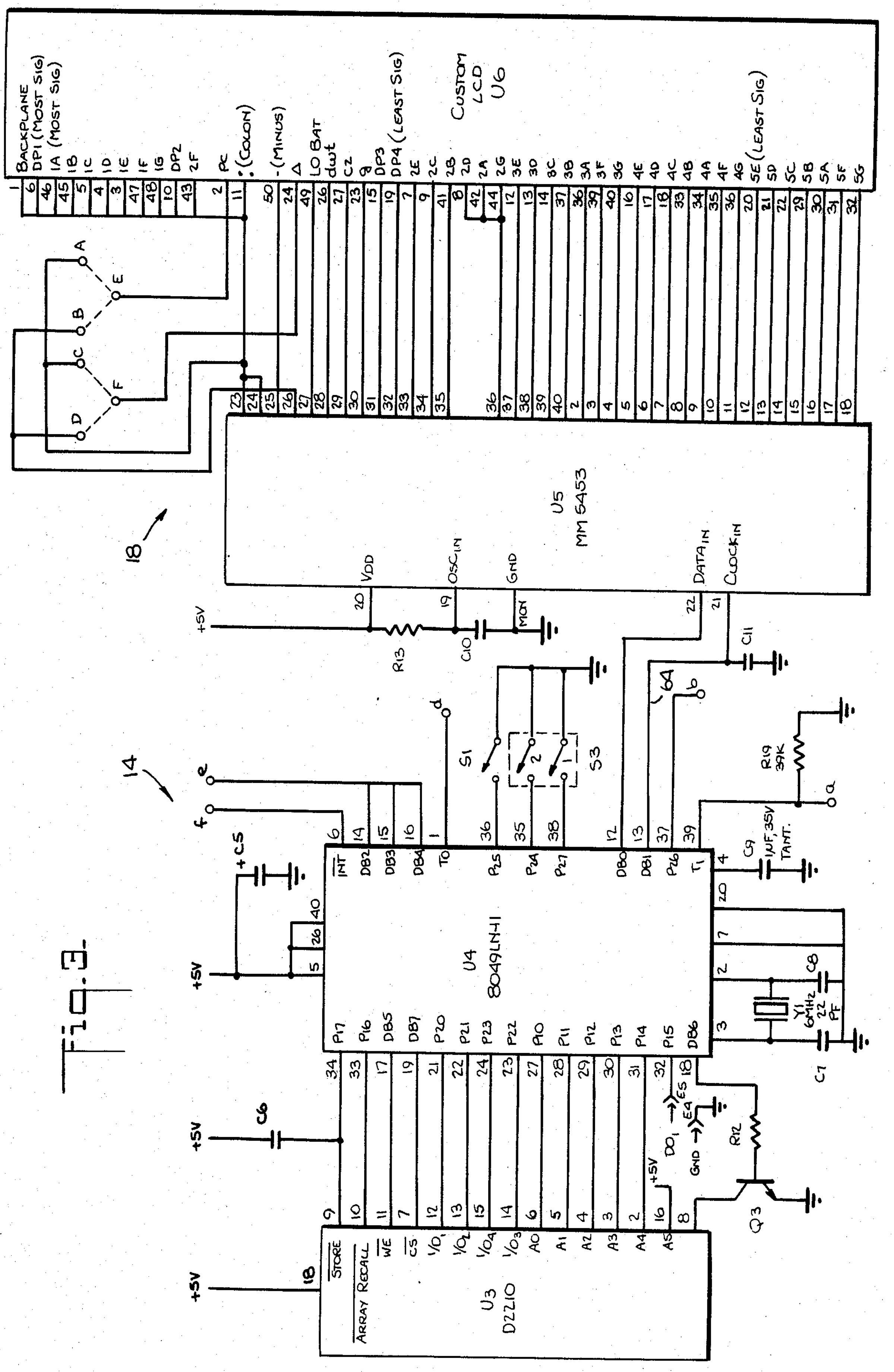
FIG. 3 is a schematic diagram of the processing and display circuitry indicated in FIG. 1.

FIG. 3 shows the arrangement of the logic and display circuits 14, 18 of the balance of the invention. This circuitry includes the microprocessor U4, which is preferably available from National Semiconductor 8049 LN-11 chip. A non-volatile memory, preferably an electrically alterable read only memory ("EAROM") U3, is also provided to store certain information while the balance is turned off. The EAROM U3 is preferably a XD 2210 chip, available from Xicor, and has four input-output data lines I/O1-4 connected to four respective port terminals P20-23 of the microprocessor U4. Port terminals P16 and P17 of the microprocessor U4 are connected, respectively, to an ARRAY RECALL input and a STORE input of the EAROM U3. P17 is also connected via capacitor C6 to the 5-volt DC supply. Two data bus terminals DB5 and DB7 of the microprocessor U4 are connected respectively to terminals $\overline{WE}$ and $\overline{CS}$ of the EAROM U3. Additional port terminals P10–P14 of the microprocessor U4 are connected to address inputs A0–A4, respectively, of EAROM U3. Data bus DB6 is connected via resistor R12 to the base of a transistor Q3, whose collector is connected to terminal 8 of EAROM U3 and whose emitter is grounded. Port terminal P15 of microprocessor U4 is unconnected. The 5-volt supply is connected to address terminal A5 and terminals 5, 26 and 40 of EAROM U3; terminals 5, 26 and 40 are also connected to ground across capacitor C5.

The clock for the microprocessor U4 is provided by an oscillator circuit comprising a crystal Y1 of frequency 6 mHz and capacitor C7 and C8 which are connected between ground and the respective two sides of the crystal Y1. The crystal terminals are also connected respectively to terminals 2 and 3 of microprocessor U4.

Port terminal P25 of microprocessor U4 is connected to one side of a momentary switch S1 whose other side is grounded. S1 serves as an OFF switch for the balance and is used with the ON/TARE switch S2 (see FIG. 4) in a manner described below to select the units in which a measured weight is to be displayed by the balance. In addition, terminals 7 and 20 are grounded and terminal 4 is connected to ground via capacitor C9.

A two-pole switch S3, one side of which is grounded and the other side of which is connected to port terminals P27 and P24 (one switch pole being connected to each terminal), serves to disable the automatic shut-off feature of the balance. According to this feature, the miroprocessor U4 turns the balance off automatically if the ON/TARE switch S2, after being depressed, is not depressed again within a set time (e.g., 30 seconds), or if switch S2 is not depressed within a set time (e.g., 45 seconds) after the balance is turned on. By actuating switch S3, however, the user disables the automatic shut-off. S3 also enables/disables the calibration routine to prevent tampering.

Terminal T1 of the microprocessor U4 is connected to the ON/TARE switch S2 (shown in FIG. 4) through diode D2 (connection (a)). In addition, terminal T0 is connected to a circuit (shown in FIG. 4) that serves to indicate when the battery is low.

Data bus terminals DB0, DB1 of the microprocessor U4 are respectively connected to the $DATA_{IN}$ and $CLOCK_{IN}$ terminals of the LCD driver circuit U5, which is a conventional circuit MM5453, available from National Semiconductor Company, used to control the liquid crystal display ("LCD") U6 of the balance. The wire 64 connecting DB1 to the $CLOCK_{IN}$ terminal is also connected to ground via a capacitor C11.

The 5-volt DC supply is also connected directly to terminal $V_{DD}$, via resistor R13 to terminal $OSC_{IN}$ and via grounded capacitor C10 to terminal GND (the ground terminal) of driver circuit U5.

The LCD U6 is designed to provide a display of the weight measured by the scale, in seven-segment digits, and to show the unit of measurment. In addition, as explained below, the microprocessor disables the display of the unit symbol until the weight measurement becomes stable enough to be considered reliable. Also, the LCD displays all segments when the balance is first turned on, and displays various prompting characters during the calibration procedure and during operation in the parts counter mode, as described below. These displays are controlled entirely by the microprocessor U4, the LCD U6 including only the liquid crystal array itself. The design of the LCD U6 is accordingly believed to be well within the skill of one of ordinary skill in the art, and therefore will not be further described herein.

Figure 4:
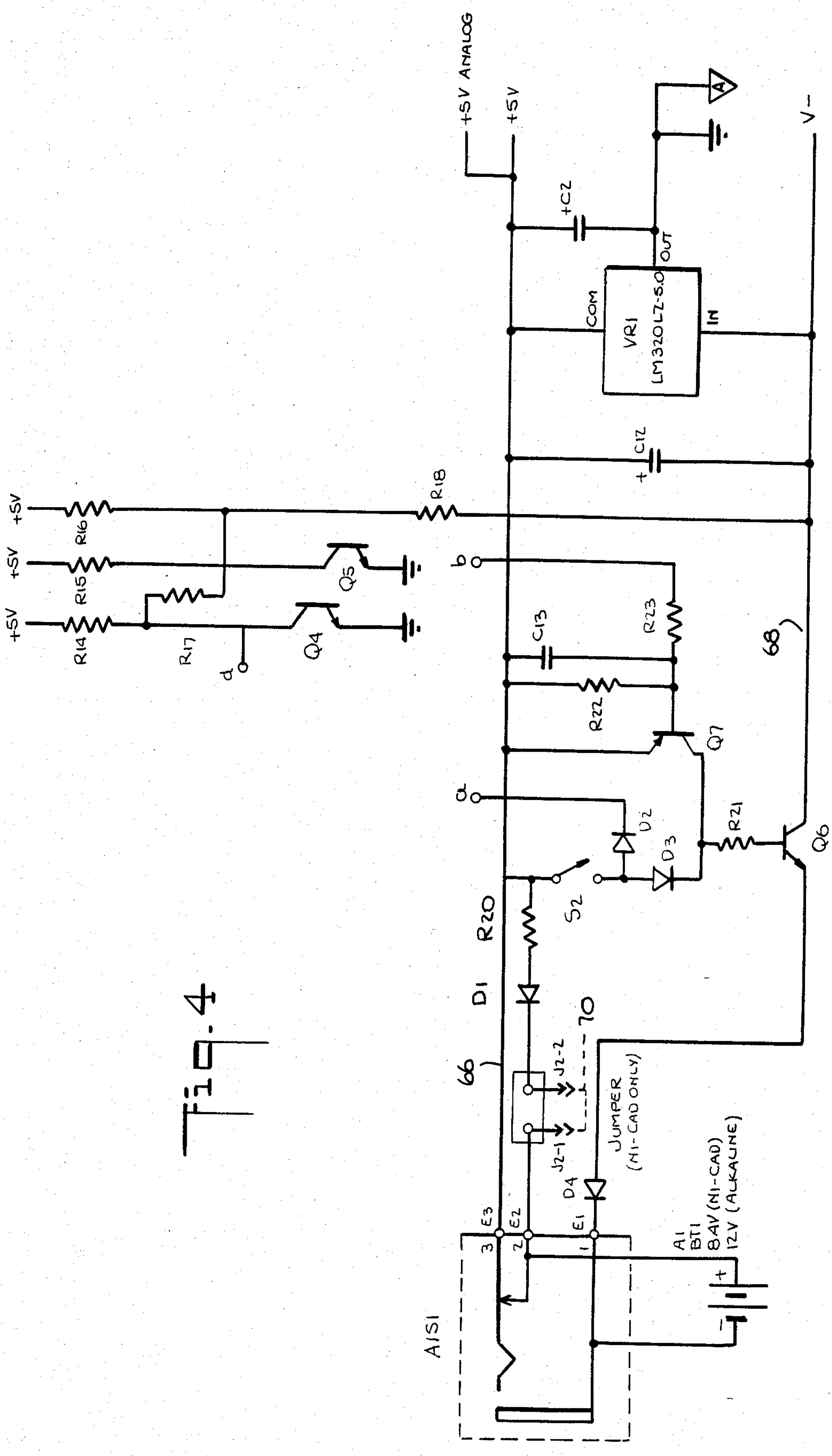
FIG. 4 is a schematic diagram of the power supply circuitry indicated in FIG. 1.
Figure 6:
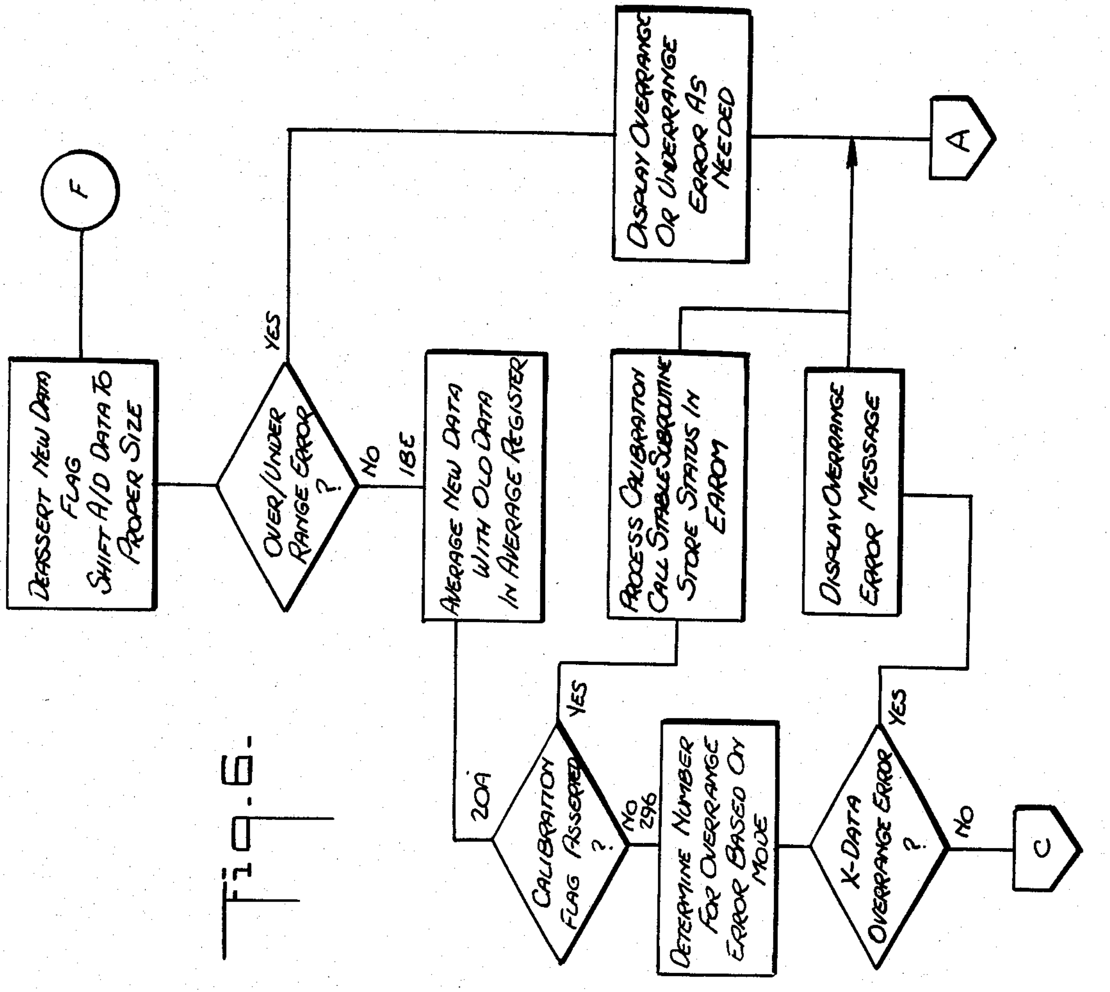
Figure 5:
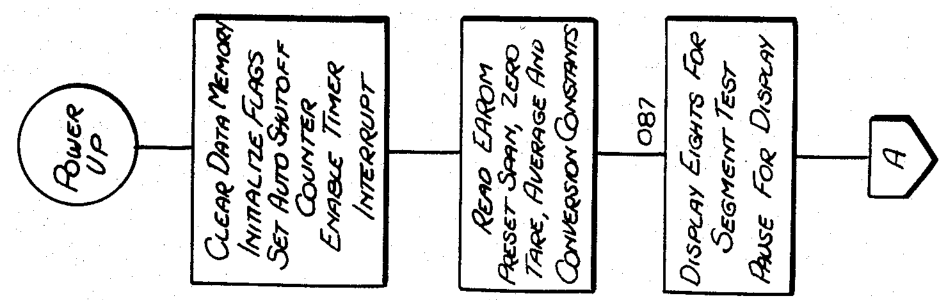

FIG. 4 shows the power supply and associated circuitry. Power is derived from a battery B1, which is preferably either an 8.4-volt nickel-cadmium battery or a 12-volt alkaline battery. The battery terminals are connected as indicated in FIG. 4 to a jack ("AISI"), which is used to plug in an external power supply to recharge the battery, if a nickel-cadmium batter is used. The jack is connected to the remainder of the power supply circuitry via terminals E1, E2 and E3. A line 66 connected to terminal E3 is also connected to the COM terminal of a voltage regulator VR1 and serves as the 5-volt supply line. VR1 is preferably a standard LM320LZ −5.0 volt voltage regulator. The OUT terminal of VR1 serves as the ground for the balance circuitry, and is connected across capacitor C2 to line 66. The IN terminal of VR1 is connected to line 68, which serves as the negative voltage supply line. In the preferred embodiment, using an alkaline battery, line 68 supplies a voltage of −7 volts DC. Lines 66 and 68 are connected via capacitor C12.

Line 68 is connected to the collector of a transistor Q6, whose emitter is connected across a diode D4 to terminal E1. The ON/TARE switch S2 is connected between line 66 and diode D3, which is connected across resistor R21 to the base of transistor Q6 and is oriented to allow current to flow into the base of Q6. A resistor R20 and a diode D1 are used as a charging circuit for a nickel-cadmium battery, and are connected to a jumper terminal J2-2. A second jumper terminal J2-1 is connected to terminal E2, and, when a nickel-cadmium battery is used, is connected by a jumper indicated in phantom at 70 to jumper terminal J2-2 to permit battery recharging. In addition, line 66 is connected to the emitter of a PNP transistor Q7, whose collector is connected to the junction between diode D3 and resistor R21. Line 66 is connected to the base of transistor Q7 via resistor R22 and capacitor C13, connected in parallel. The base of Q7 is also connected by a resistor R23 to port terminal P26 of the microprocessor U4. The junction between diode D3 and switch S2 is connected across diode D2 to terminal T1, which is also connected to ground across resistor R19. When switch S2 is depressed to turn the balance on, Q6 is turned on. The microprocessor U4 latches on transistor Q7, which serves as a latch to hold Q6 on after S2 is released.

To indicate when the battery is low, transistors Q4 and Q5 are provided. The collector of Q4 is connected to terminal To of the microprocessor U4 and, across resistor R14, to the 5-volt DC supply. The base of Q4 is connected to the collector of Q5 and, across a resistor R15, to the 5-volt supply. The base of Q5 is connected to the positive and negative voltage supply lines across resistors R16 and R18, respectively, and across resistor R17 to the collector of Q4. The emitters of both Q4 and Q5 are grounded.

As the battery B1 weakens, the voltage on the negative supply line gradually rises, raising the base voltage of Q5 and eventually turning Q5 on. This essentially grounds the base of Q4, turning Q4 off and raising the voltage of terminal To from its normal low state to the high state. When this occurs, the microprocessor U4 causes the LCD U5 to display a "battery low" symbol.

MODE OF OPERATION OF THE BALANCE

When the power is turned on by means of the ON/-TARE switch S2, the LCD U5 initially verifies that all liquid crystal segments of the LCD are operating correctly by displaying all segments briefly.

The balance is capable of displaying weights in several units. Typically, the user will have a choice of grams, ounces and penny weights (or some other custom unit ordered by the customer in place of penny weights, e.g., carats, taels, etc.). In addition, the user can choose to operate the scale in a parts counter mode, described below. (It is particularly contemplated that a given balance will offer the user either a choice among several units, or a choice between weight measurement with the result expressed in, e.g., grams and operation in the parts counter mode, but not both; however, it is believed that from the present disclosure, one of ordinary skill in the art could design and produce a balance having both arrangements, and such a balance is considered to be within the scope of the invention.) After the segment verification display disappears, a symbol for one of the possible units will appear (e.g., "g" for grams). If the user wants a different unit, he simultaneously depresses switches S1 and S2 and then releases them. This causes the balance to display another of the units with which it has been provided. This procedure is repeated until the symbol of the unit the user desires is displayed. When the balance is then used for weighing, the result will be expressed in whatever unit is displayed as a result of the unit-shifting procedure just described.

In a balance having the parts counter mode, simultaneous actuation of both switches S1 and S2 activates the parts counter mode. In the illustrated embodiment, once this mode has been selected, it is impossible to return to the ordinary weighing mode except by turning the balance off and then on again.

For weighing, when the units have been selected, an empty container is placed on the pan, and the ON/-TARE switch S2 is depressed to tare the balance. The sample is then placed in the container and the weight of the sample is displayed by the LCD.

To enter the parts counter mode, the user depresses the switches S1 and S2 together and releases them, and the balance displays the prompting characters "CON". The empty container is then placed on the pan, and the balance is tared. The balance then displays "5". By pressing S1 and S2 simultaneously, the user causes the balance to display "10". This can be repeated to shift to "20". (If the process is again repeated, the tare prompt characters "CON" will again be displayed, and the balance must be tared again before anything further can be done, except by turning off and reactivating the balance.) A number of pieces equal to the display number is placed in the container and the ON/TARE switch S2 is depressed again. This enables the balance to determine the unit weight of the parts. The user then places the sample to be counted in the container and again depresses the ON/TARE switch S2, and the number of parts in the sample is displayed on the LCD.

In the weighing mode, to indicate when a reliable reading has been obtained, the balance does not display a unit symbol at the end of the read-out until flutter of the weight measurement falls below a predetermined level, indicating that stability has been achieved. In the weighing mode, the unit symbol then appears in order to indicate stability.

In the parts counting mode, the user is required to retare the balance with the empty container each time a new initial sample (i.e., the parts counter calibration sample of 5, 10 or 20 pieces) is used, to protect against drift. To ensure that the user does not omit this step, each time the initial sample is changed, the balance displays a tare prompt display on the LCD and will not make a measurement until the ON/TARE switch S2 has been depressed again to retare the balance.

Calibration of the balance is begun in the factory by adjustment of potentiometer R1, to balance the bridge 22 as indicated above. R1 is then sealed to prevent readjustment of it. Final calibration can be done at the factory or by the user. To calibrate the balance, the ON/-TARE switch S2 is depressed and held down for a minimum predetermined period of time, preferably five seconds. When the five second period is up, the LCD displays "-C-" for a short time, and then, after the switch S2 is released, "CAL". Switch S2 is then depressed to tare the balance. When this has been done, a standard weight equal to the full scale capacity of the balance (in the preferred embodiment, either 300 grams or 3000 grams) is put on the pan, and switch S2 is again depressed. This completes calibration. The calibration routine can be disabled by a switch (S3) provided for that purpose, to prevent tampering. When the balance is turned off, whether manually or by the automatic shut-off feature described above, the non-volatile memory U3 automatically stores a record of the units selected by the user. When the balance is reactivated, this unit is the first one offered to the user, so that the user need not cycle through all the possible units again.

The Software

In the preferred embodiment, the balance is controlled by the microprocessor U4, using software described herein. The best mode now contemplated by practicing the invention is to use the program identified as Appendix I to this specification, which Appendix is a part of this disclosure. Details beyond those given below are to be found in Appendix I. The source listing reproduced in Appendix I is in assembler's language for an 8049 microprocessor. In FIGS. 5–17, the hexadecimal numbers beside some boxes of the flow charts indicate program step locations in the program memory. The appended program listing is to be taken as controlling and as the authoritative, enabling disclosure of the software of the invention, in preference to the following description and flowcharts.

The microprocessor U4 runs in a closed loop, which is interrupted once every 1 ms. by a timer, when the microprocessor U4 generates a feedback pulse as described above. After the generation of each feedback pulse, the microprocessor resumes executing the main loop. A digital filter algorithm in the timer interrupt routine processes the data pulses in batches, and the results of this processing are accumulated until a certain number of pulses have been processed. The accumulated processed data batch is then averaged by the main program loop with earlier data, until the weighing of the sample has been completed.

When the scale is turned on, the data memory (a portion of the RAM of microprocessor U4) is cleared, and all program flags are given their proper initial values. The timer to control automatic balance shut-off is also activated, and the timer interrupt is enabled.

The microprocessor then reads the EAROM U3, using a routine described below in connection with FIGS. 14*a* and 14*b*, to retrieve the calibration constants, the ADC data indicating zero tare, the average constant (i.e., the number of readings to be averaged before displaying a result), and the conversion constants needed to translate the ADC data into the various possible units. The liquid crystal segments are then displayed on the LCD for the verification test. The routine passes until this test is complete.

Figure 7:
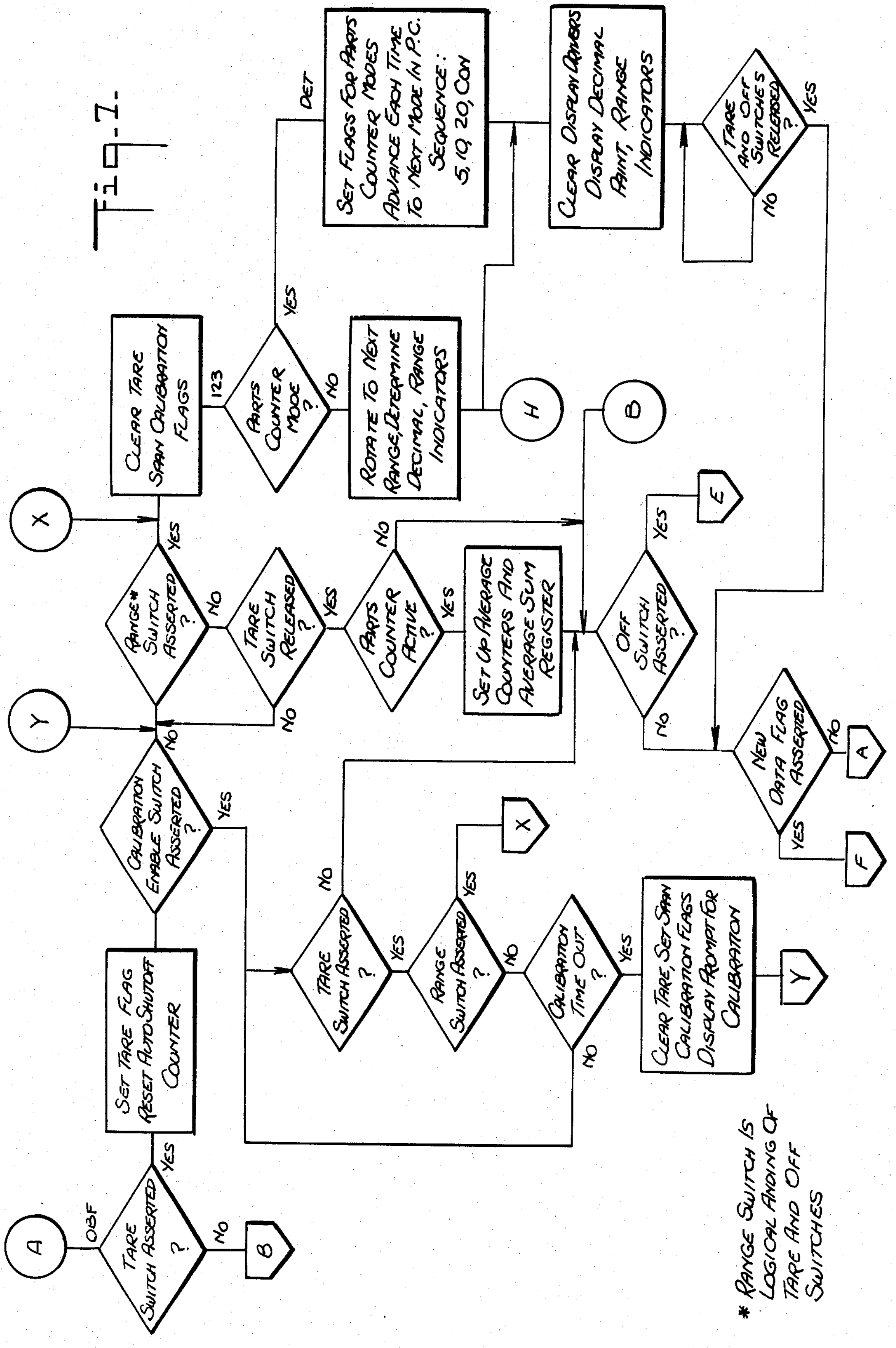

The routine then continues from point "A" in FIG. 7, first determining whether the ON/TARE switch S2 is depressed. If not, the routine proceeds to point "B" in FIG. 7, and determines whether the "OFF" switch S1 is depressed. If so, the routine proceeds to point "E" in FIG. 8, loads into the EAROM U3 data indicating the balance status (i.e., the units last selected by the user) and turns off the balance.

If the OFF switch S1 is not asserted when checked after point "B", the routine checks to see whether a new datum flag is asserted (i.e., whether a new data pulse is ready for averaging); if not, the routine returns to point "A", while if a new pulse is ready, the routine proceeds to point "F" and proceeds as described below.

If after point "A", the ON/TARE switch S2 is asserted when checked, the routine sets a tare flag which indicates this fact, and resets the automatic shut-off timer. If the calibration routine has not been disabled, the routine proceeds to point "Y"; otherwise, switch S2 is again checked. If switch S2 is not being asserted, the routine again proceeds to point "B". If switch S2 is depressed, however, the routine checks whether S1 is also depressed. If both are being asserted simultaneously, the routine proceeds to point "X" to perform unit selection (referred to in the Figures as "range" selection). If switch S1 is not asserted, however, the routine determines whether the ON/TARE switch S2 has been depressed for the full five seconds needed to access the calibration process; if not, it returns to point "K" of the routine, while otherwise, the tare flag is cleared, the span calibration flag is set and the calibration prompt "-C-" is displayed on the LCD. The routine then proceeds to point "Y". (This is the beginning of calibration, but the actual calibration process is performed subsequently to point "F", as described below.)

At point "Y", switches S1 and S2 are checked to determine whether both are asserted simultaneously to select the display units or, if the balance has the parts counter mode, to chose between the parts counter mode and the weighing mode. (Balances of both types have identically programmed microprocessors, the balance type being determined by information stored in the EAROM U3 and retrieved from there by the microprocessor U4 when the balance is turned on. In this manner, all balances according to the invention can be manufactured the same way, differing only in that different EAROM's are included.) If not, it is determined whether switch S2 has been released; if switch S2 has not been released, the routine returns to point "Y". If S2 has been released and the parts counter mode has not been selected, the routine proceeds to point "B". If switch S2 has been released, and if the parts counter mode has been selected by the user, the routine sets up the average counters and the average sum register to operate in this mode. The routine then proceeds to point "B".

For unit or mode selection, the routine proceeds from point "X" to clear the tare and span calibration flags. In the parts counter mode, the appropriate flags are set, and the LCD initially displays "CON". On subsequent passes through the routine from point "X", if the container has been tared, the switches S1 and S2 are depressed and released one or more times (once per pass) to enter the number of pieces to be included in the initial sample. The display driver U5 is then cleared, and the decimal point and unit symbol are displayed. The routine then waits for release of switches S1 and S2, and looks for a new data flag. If the flag is asserted, the routine continues from point "F", and otherwise, the routine returns to point "A".

If the parts counter mode is not available in the balance in question, then from point "X" the routine displays the possible units in sequence, changing to the next unit each time switches S1 and S2 are simultaneously depressed and then released (one unit change per pass). After clearing the driver U5 and displaying the decimal point and unit, the program then waits for switch release, looks for a new data flag, and proceeds to point "F" or point "A" as described in the preceding paragraph.

As stated above, the processing of data by the main program loop begins at point "F". From point "F", the microprocessor U4 de-asserts the new-data flag that sent the routine to Point "F" (This is necessary to retian the full desired number of significant digits.) It is then determined whether the shifted data falls within the range of the balance. If not, an overrange-error or underrange-error signal ("EEE" and " - - - ", respectively) is displayed, and the routine returns to point "A". If no such error is present, the new data is averaged with previously received and processed data. If the calibration routine has ben accessed by the user, calibration is now effected by means of the calibration routine (described below), after which the main routine returns to point "A". If no calibration flag is asserted, another check is made for overrange error after determining the error limits proper to the selected mode (weighing or parts counter), a suitable error message is displayed if necessary, and the routine returns to point "A". If no error is present, the routine proceeds to point "C".

As shown in FIG. 9, proceeding from point "C", the routine determines whether a sample is already set (This is done whether the balance is in, or has, the parts-counting mode, because the following steps are performed in any event.) If so, it then checks whether the balance has been tared, and checks that the measurement is sufficiently stable to be reliable (the stability-determination routine is described below). If both of these conditions are satisfied, the tare flag is cleared, and the contents of the tare register are subtracted from the new data. If either of these two conditions is not satisfied, or if the parts counter flag has been asserted, then the tare flag is left as is, and the minus sign in the average register is cleared. The contents of average register are then added to the tare register. If the result of this operation is negative, the minus sign is set again, and the 2's complement of the weight-after-tare ("W.A.T.") register is taken to obtain a positive value. After this, or if no negative result is obtained, the routine proceeds to point "P" of the program.

As shown in FIG. 10, from point "P", the routine first checks to determine whether the parts counter flag is asserted. If the parts counter mode has not been selected, then the averaged data in the average counter is divided by the total range of the balance and the result is converted to an indication of the weight of the sample expressed the units chosen by the user. If the data is sufficiently stable to be reliable, the appropriate flags are asserted, and if the data is non-zero, the routine proceeds to point "D" to display the data. If the data is equal to zero, the minus sign is cleared before proceeding to point "D".

From point "P", if the parts counter mode has been asserted, the microprocessor determines the stability of the data according to a different standard, which detects fluctuations of approximately 20 milligrams (compared to approximately 100 milligrams for the normal mode of operation). If the parts constant has not already been set, then the program proceeds to point "L". If the parts constant (i.e., the number of units in the initial sample used to determine unit weight) has already been selected by the user, the routine multiplies the data by 10 and then divides by the parts constant. The resulting data is then processed as in the normal mode.

As indicated in FIG. 11, from point "L", the routine first determines whether the container has been tared. If not, it checks to see whether a container tare has been requested, and if so, the stability of the measurement is checked. If the stability is insufficient, the routine returns to point "B"; otherwise, the tare flag is cleared, and the 2's complement of the tare register contents is taken. The routine then proceeds to point "M".

If the container has not been tared and a tare has not now been requested by the user, then the tare container prompt "CON" is displayed on the LCD U6, after which the routine turns to point "A".

Proceeding from point "M", if the user has not already set the initial sample size, the LCD unit U6 displays a prompt to load the sample, after which the routine returns to point "A". If the number of units in the initial sample has been entered, the routine proceeds to point "H" to clear the display if the measurement is insufficiently stable, but otherwise subtracts the tare value from the average value obtained from the measurement. If this operation produces a zero or negative weight, the signal for underrange error is displayed and the routine returns to point "A"; otherwise, the weight of the initial sample is divided by the number of units therein to obtain the unit weight. The routine then returns to point "G".

Figure 8:
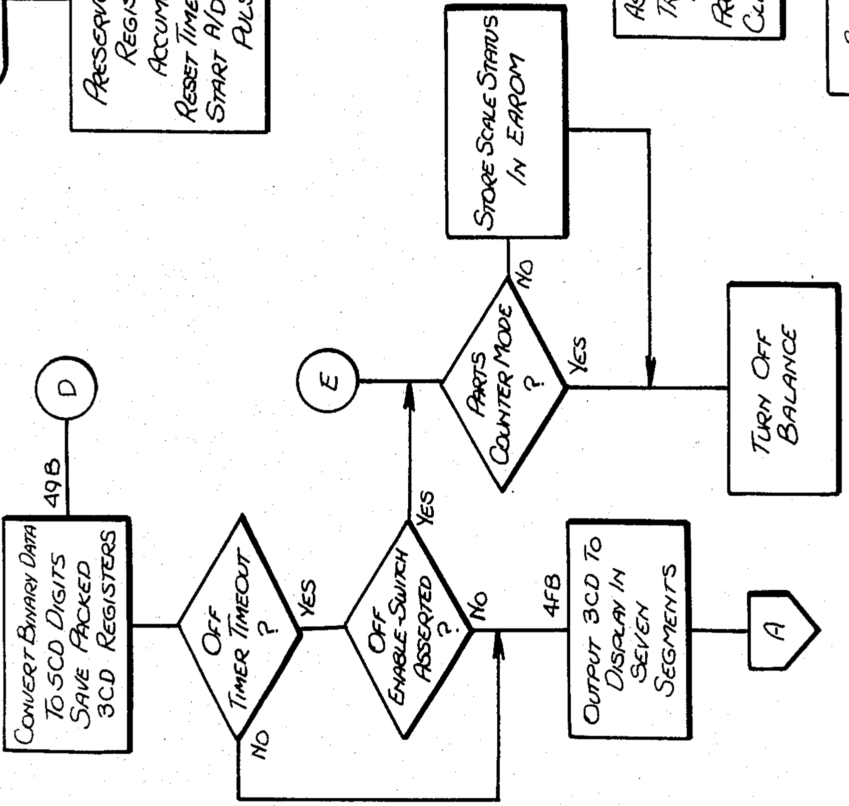

In any mode, once the final measurement has been made and determined to be sufficiently stable, the routine proceeds from point "D" as shown in FIG. 8, converting the binary data to binary coded digital ("BCD") data, which is saved in BCD registers in the microprocessor U4. Unless the automatic shut-off timer has timed out, the data in the BCD registers is displayed on the LCD U5, and the routine returns to point "A". If the timer has timed out, switch S3-1 (the automatic shut-off override switch) is checked; if it is on, the routine proceeds to point "E" and turns off the balance as described above, while otherwise the data in the BCD registers is displayed and the routine returns to point "A".

Figure 12:
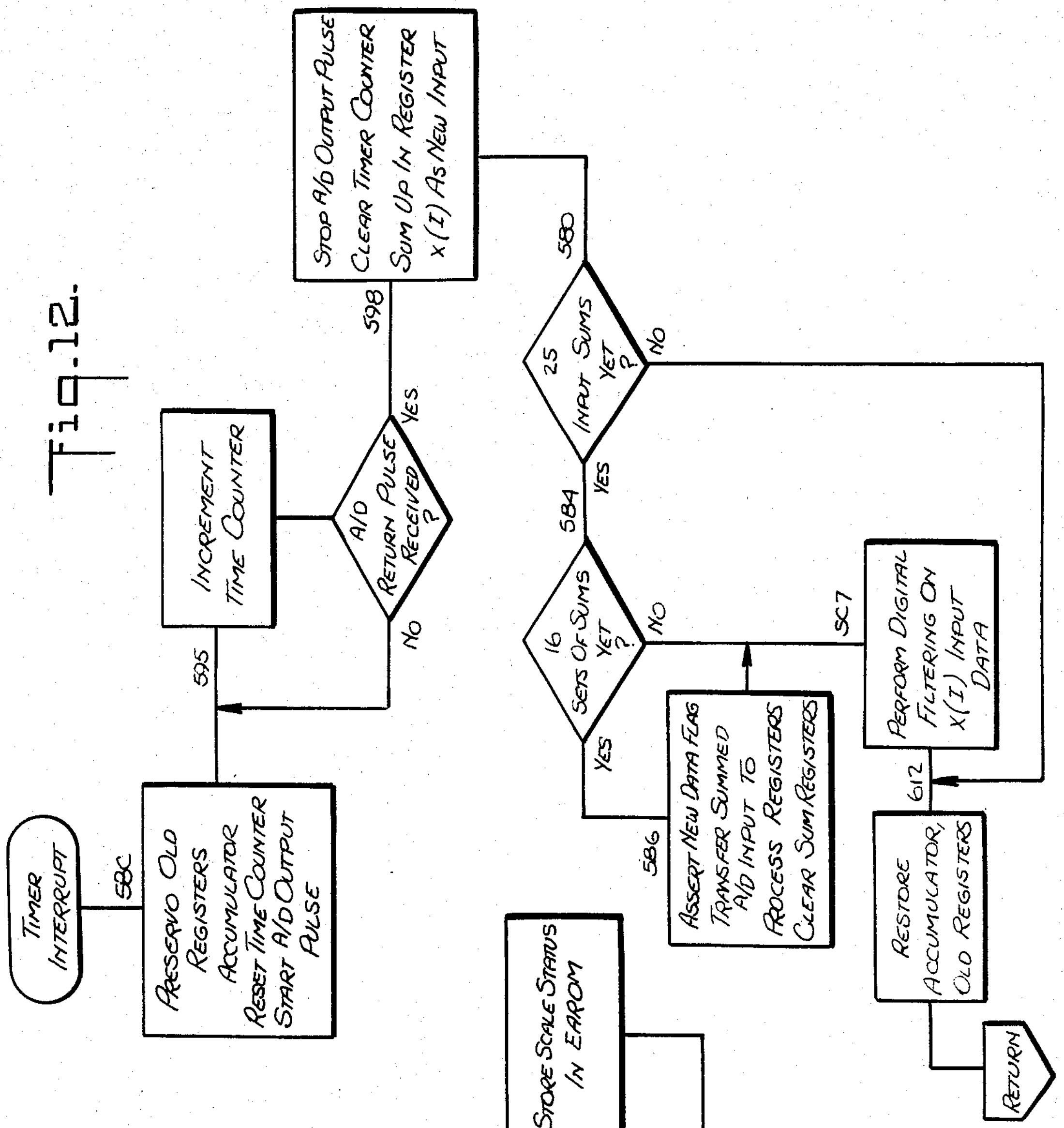

FIG. 12 illustrates the timer interrupt routine which is initiated by the timer approximately ever millisecond, when the timer generates a feedbac pulse and measures how long the feedback pulse must be to return the integration to the desired level. When this occurs, the main routine, described above in connection with FIGS. 5-11, is halted wherever it is, the necessary information in the registers, accumulator and time counter being preserved while the timer interrupt routine is run. The timer interrupt counter is then reset, and a pulse-length counter counts up a number of counts proportional to the length of the pulse output to the gate of transistor Q2. When the ADC output pulse has terminated and FET Q2 has been turned off, the count in the pulse-length counter is summed up in a register as a new input X(I), and the pulse length counter is cleared. The old accumulator and register values are restored to resume running the main routine. If a multiple of twenty-five such input sums have been received, the sums are filtered by means of a digital filtering subroutine described below, after which the old accumulator and register values are restored. After each sixteen sets of twenty-five sums, the new-data flag is asserted, and, after the filtering, the summed ADC output (i.e., the four hundred input sums) is stored in the process registers, after which the sum register is cleared. After filtering and restoration of the pre-interrupt register values, the microprocessor U4 returns to the main routine.

Figure 13:
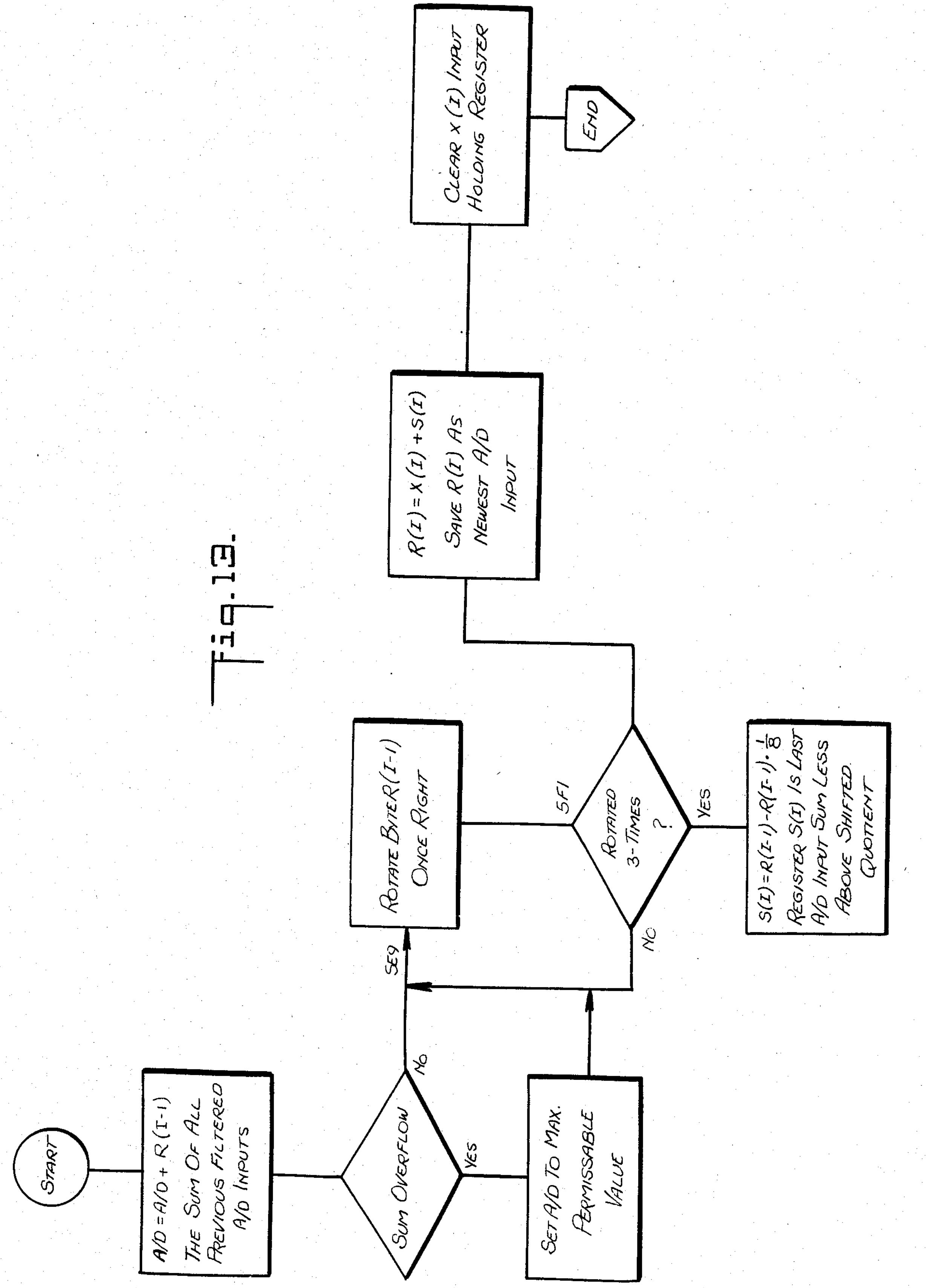

FIG. 13 shows the filter subroutine. As can be seen, the sum R(I-1) of all previously filtered inputs is first added to the sum register. (This sum register is cleared after each sixteen sums.) If this results in an overflow of the sum register, the register is set to the maximum permissible value. Thereafter, or if there is no overflow, R(I-1) (stored in a separate sum register) is divided by means of being rotated one bit to the right three times in succession. The result is then subtracted from the preceding value R(I-1) to produce the value S(I). A new value R(I) is calculated according to the equation $R(I)=X(I)+S(I)=X(I)+7R(I-1)/8$, where X(I) is the most recently added sum from the pulse-length counter. The X(I) input holding register is then cleared, and the filtering subroutine is complete. This subroutine ensures that minor flutters in the signal received from the strain gauge do not produce a corresponding flutter in the weight displayed by the balance. This feature permits the balance to be used for such purposes as weighing animals.

Figures 14A, 14B:
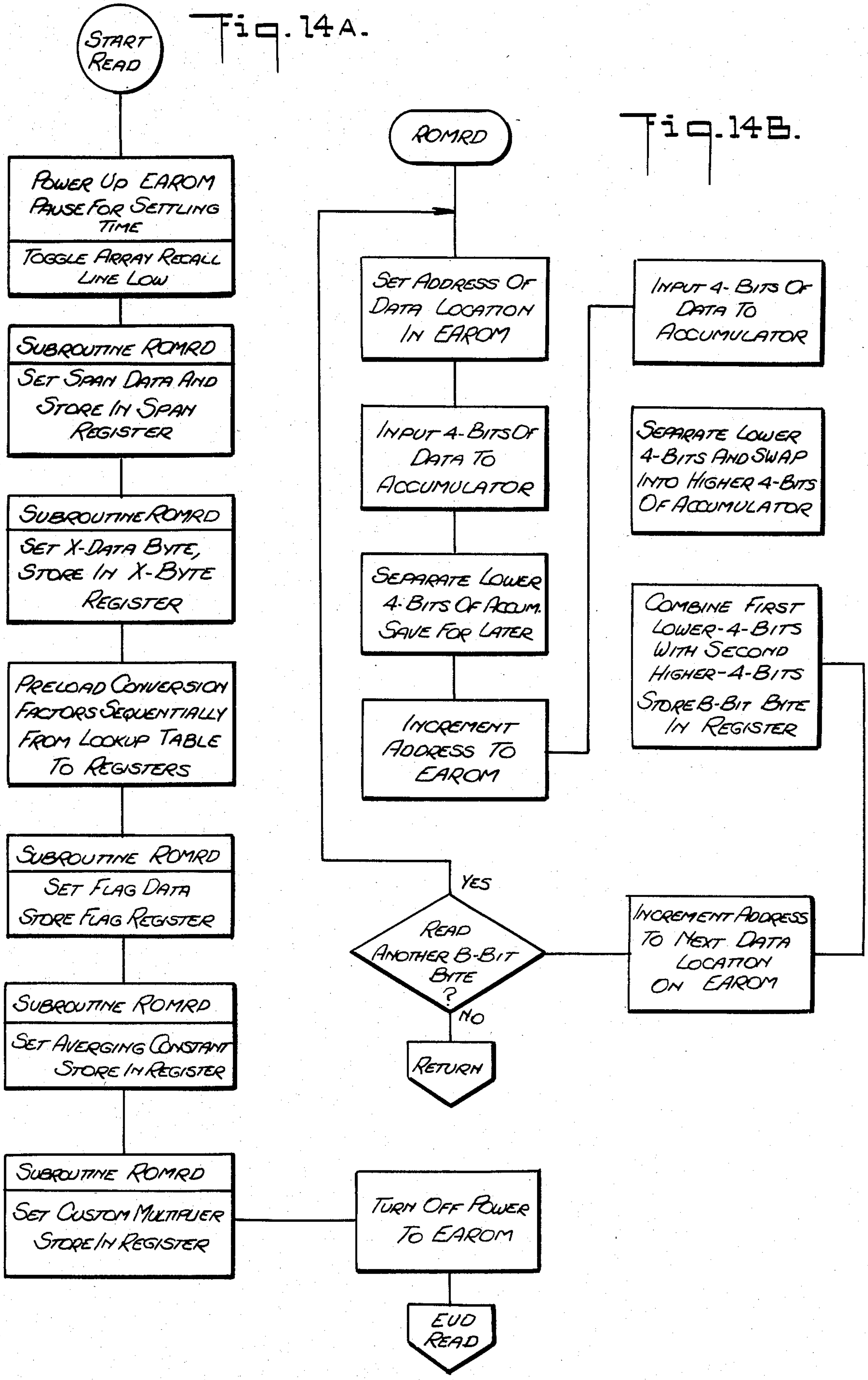

FIGS. 14*a* and 14*b* show the procedure for reading data from the EAROM. To begin with, the EAROM is powered up by the microprocessor U4 by means of the transistor Q3. After a pause for settling time, the array recall line is toggled low. The subroutine ROMRD (described below) is then called and used to retrieve the bytes containing status information and then is used again to retrieve the X data byte, various conversion factors (which are sequentially looked up from tables in the EAROM U3), the values of the various flags, the averaging constant and the custom multiplier (i.e., the multiplier used to convert data to any custom units the user may have ordered). These data, as they are extracted from the EAROM, are stored in suitable registers in the microprocessor U4. After this has been done, the power to the EAROM U3 is turned off by means of transistor Q3, ending the routine.

The subroutine ROMRD begins by settling the address of the data location to be read from the EAROM, and four bits of data are input to the accumulator of microprocessor U4. The lower four bits in the accumulator are stored elsewhere for later use. The EAROM address is then incremented, and an additional four bits are transferred to the accumulator. The lower four bits of the new datum are again separated and are transferred to the four high bits of the accumulator. The previously obtained low four bits recovered from the EAROM are then returned to the low four bits of the accumulator. The resulting eight bit byte is stored in the appropriate register in the microprocessor U4. The EAROM address on the microprocessor terminals P10 through P14 is then incremented, and the process is repeated for each additional eight-bit byte to be read from the EAROM. The microprocessor then returns to the "READ EAROM" routine.

Figures 15A, 15B:
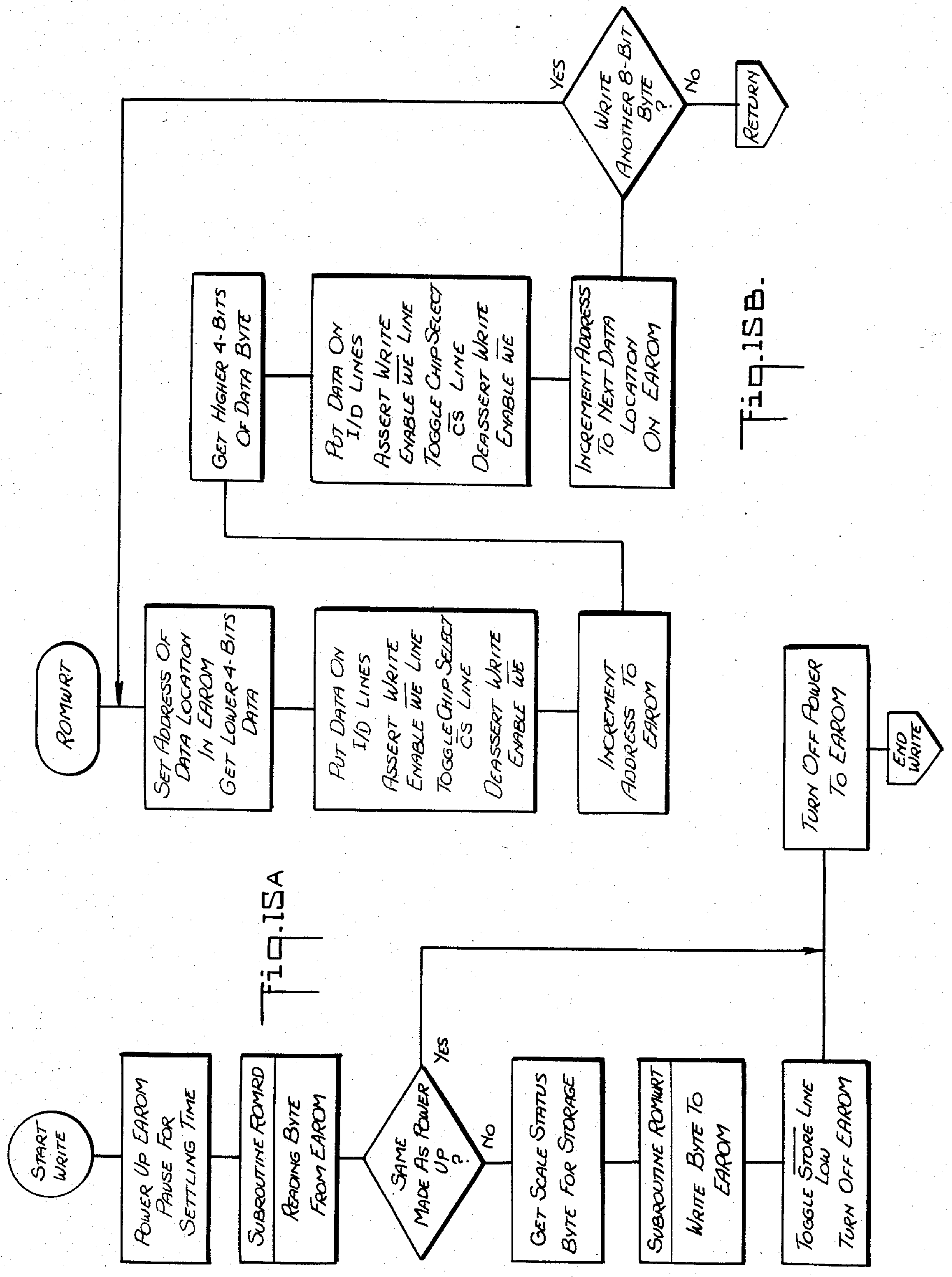

FIGS. 15*a* and 15*b* show the routine for writing information into the EAROM, which is done preparatory to the balance being turned off to save the balance status, and which is also done to store calibration data. The EAROM is powered up by the microprocessor U4 by means of the transistor Q3. The subroutine ROMRD is used to read in a byte from the EAROM. If the write enable flag is set, the data byte to be written into the EAROM is summoned from the register where it is stored in the microprocessor. The subroutine ROMWRT (described below) is then called and used to write the byte into the EAROM. The STORE line of the EAROM is then toggled low, and the EAROM is turned off. Power to the EAROM is then turned off by transistor Q3, ending the routine. If the balance status is the same as when the balance was turned on, or if the balance is in the parts counter mode, no attempt is made to store information in the EAROM when the balance is being turned off. The write routine is terminated immediately after turning off power to the EAROM.

The subroutine ROMWRT begins with the microprocessor setting the address of the data location to which data is to be written. The lower four bits of the data are called from the microprocessor register where they are stored and are placed on the four input/output lines of the EAROM (I/O1-4). A low input is then applied to the WE terminal of the EAROM, and the input to the CS line is toggled, entering the four bits in the EAROM. The input to the WE line is then toggled high, and after the EAROM address is incremented, the upper four bits of the byte to be stored are entered in the same manner. When this has been done, the subroutine is repeated for each eight-bit byte that is to be stored. When all such bytes have been sotred, the microprocessor returns to the WRITE EAROM routine.

Figure 16:
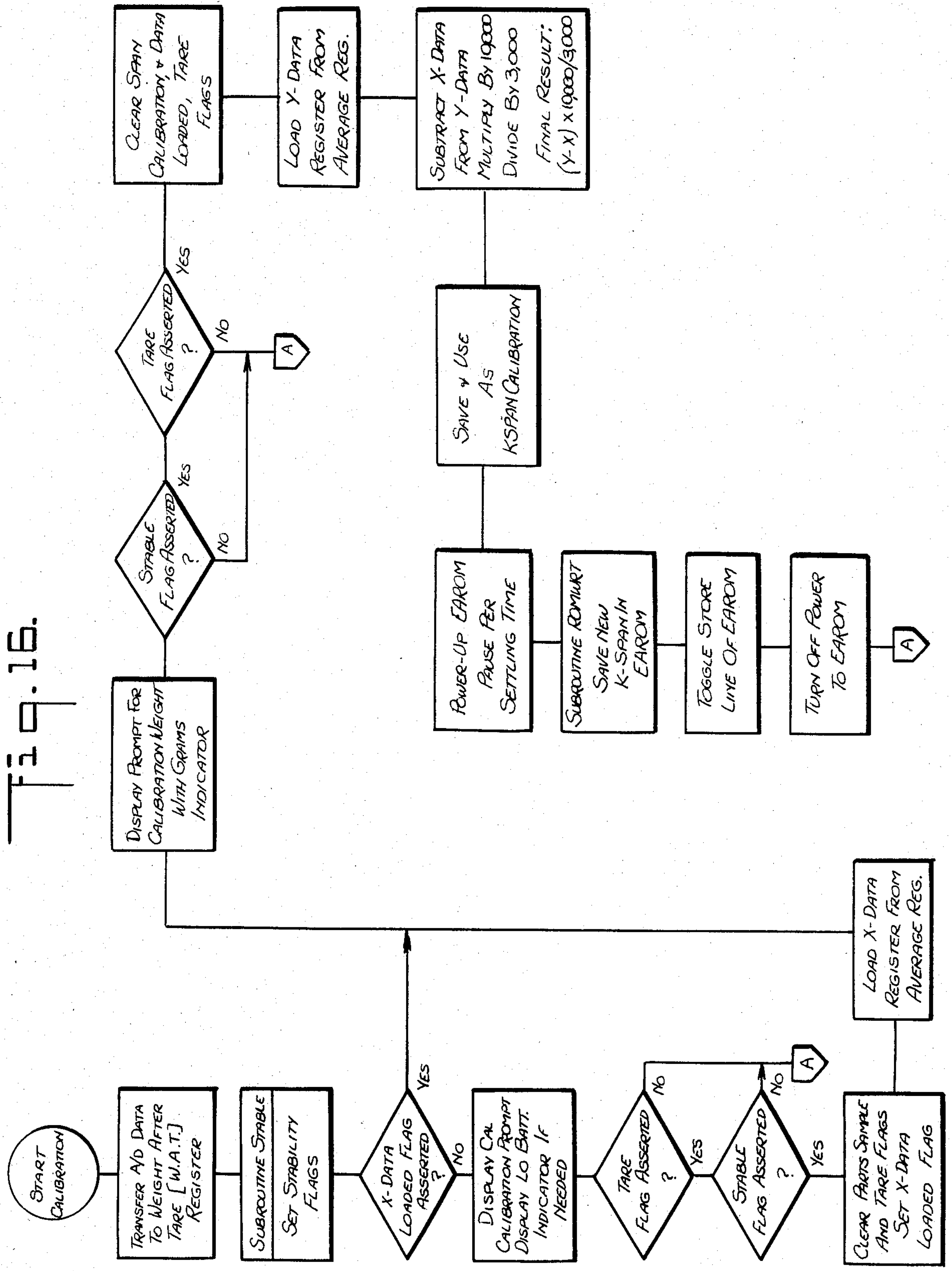

FIG. 16 shows the calibration routine. This routine is begun by transferring the ADC output data to the weight-after-tare register (because the stability routine operates on the contents of this register, as described below. The stability of the data is then determined. If the X data has not yet been loaded, then the calibration prompt "CAL" is displayed. If the switch S2 is off or if the stability is found to be insufficient, the program returns to point "A" of the main routine. Otherwise, it proceeds to clear the parts sample flag (because calibration in the parts counter mode would invalidate subsequent parts counter mode results) and the tare flag, and sets the X data loaded flag. The X data is then loaded into the X data register from the average register. A calibration weight prompt is then displayed, with the grams symbol "g". If the resulting measurement is sufficiently stable and if the tare switch S2 is depressed, the routine proceeds to clear the span calibration, tare and X data loaded flags; otherwise, the routine returns to point "A" of the main program. After clearance of the flags, data is loaded from the average register to the Y data register, and the contents of the X data register are subtracted from the Y data register. The result is multiplied by 10,000 (to retain the desired number of significant digits in the ensuing division) and is then divided by the full range of the balance (300 or 3000 grams). The result is saved and is thereafter used as the full range calibration datum "KSPAN". The EAROM U3 is then powered up, and after a pause for settling time, the KSPAN data is stored in the EAROM using the ROMWRT sub-routine. The routine then returns to point "A".

Figure 17:
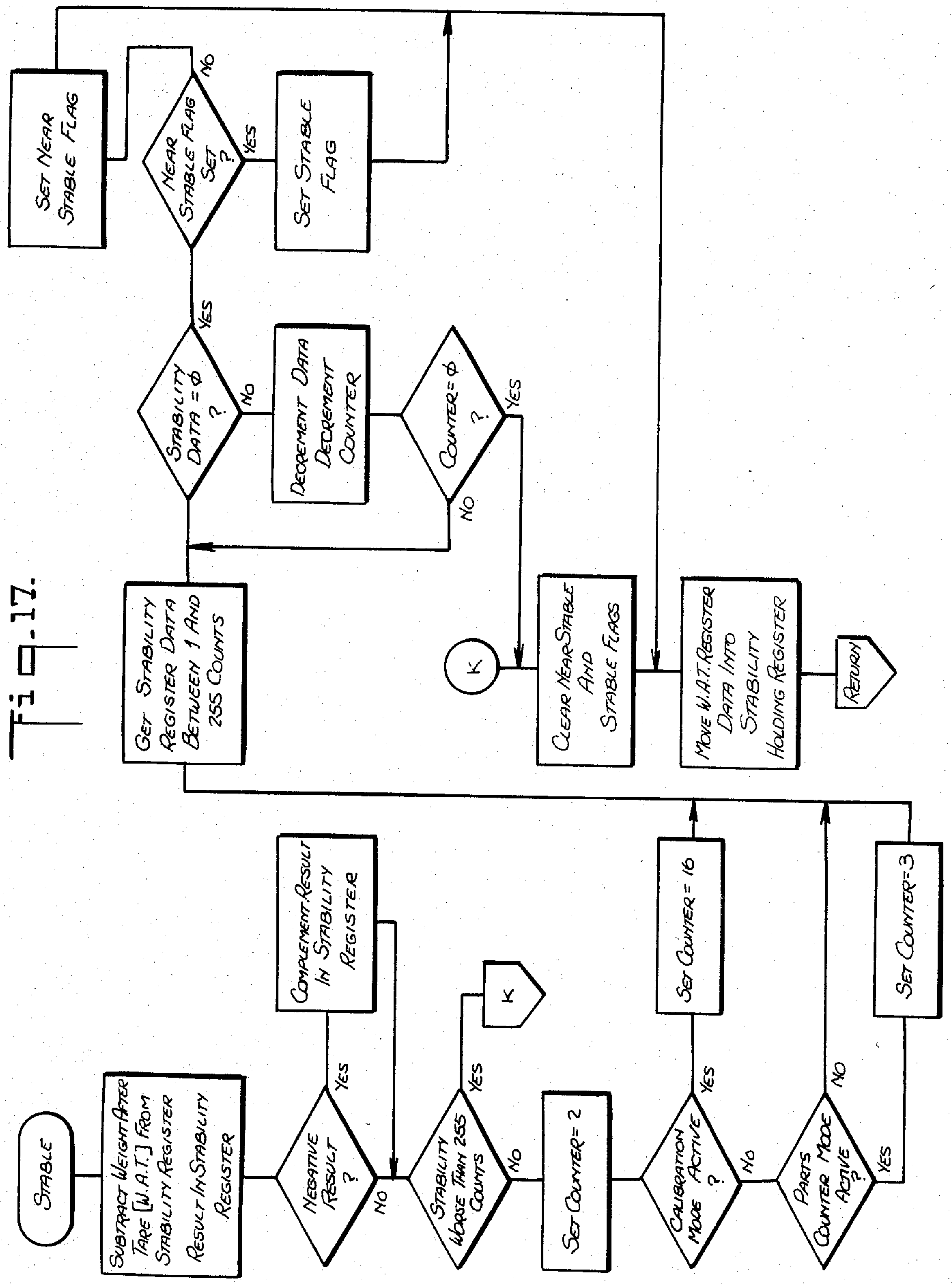

FIG. 17 shows the routine for determining stability. This routine first subtracts the current data whose stability is in question from the stability holding register. If the absolute value of the difference exceeds a certain value, the routine goes to point "K", clears the flags indicating an acceptable or nearly acceptable degree of stability, transfers the WAT register data to the stability holding register, and returns to the main routine. Otherwise, the routine sets a counter to 2 (16 for the calibration routine, because stability is checked or uncalibrated data during that routine, and 3 in the parts counter mode). The stability register contents are repeatedly decremented along with the counter until one or the other is zero. If the counter reaches zero first the routine goes to point "K"; otherwise the near-stable flag is set, or if that flag was already set, the stable flag is set, indicating acceptable stability. The WAT register data is moved to the stability holding register, and the routine returns. In effect, if two consecutive pairs of data differ by sufficiently small amounts, stability is considered to have been attained.

Although it is preferred to use software to practice the invention, hardware implementations are also within the scope of the invention. Also, the disclosed ADC circuitry could be replaced by other circuitry that would generate width-modulated pulses to represent weight, and the digital filter disclosed could be replaced with another digital filter algorithm (or, if desired for any reason, with an analog filter located between the difference amplifier and the integrator circuit), without departing from the scope of the invention.

Although the present invention has been described with particular reference to one preferred embodiment thereof by way of illustration only, many modifications and variations thereof will now be apparent to those skilled in the art. Accordingly, the scope of the present invention is to be limited not by the illustrative details described herein, but only by the terms of the appended claims.

```
ISIS-II MCS-48/UPI-41 MACRO ASSEMBLER, V3.0                 APPENDIX I
                                                            PAGE    1

LOC  OBJ        LINE        SOURCE STATEMENT

;        AN622  STRAIN GUAGE PROJECT   AN622.ROM     4/22/82
      ;    PUSH BUTTON CALIBRATION, ERROR LIMITS, CONVERSION FACTORS,
      ;    NEW PC BOARD, DIGITAL FILTER, NEW LCD DISPLAY, PARTS COUNTING
      ;--------------------------------------------------------------------------
      ;          RB0   <INTERRUPT>               ;          RB1   <MAIN LOOP>
      ;R0    SCRATCH                             ;R0      SCRATCH
      ;R1       "                                ;R1         "
      ;R2       "                                ;R2         "
      ;R3    SAVE ACCUMULATOR                    ;R3    SAVE ACCUMULATOR
      ;R4    COUNTER COPY<LS>                    ;R4      SCRATCH
      ;R5    COUNTER COPY<MS>                    ;R5     FLAG REGISTER
      ;R6    FREQ COUNTER <MS>                   ;R6      SCRATCH
      ;R7    FREQ COUNTER <LS>                   ;R7         "
      ;--------------------------------------------------------------------------
      ;   B7   ;   B6   ;   B5   ;  B4   ;   B3   ;  B2   ;  B1    ;  B0    ;
      ;--------------------------------------------------------------------------
      ;                    R5 - MAIN FLAG REGISTER
      ;--------------------------------------------------------------------------
      ; PARTS  ;CAPACITY,  SPAN   ; MINUS  ; X DATA ;  TARE  ;  NEAR  ; STABLE ;
      ; SAMPLE ; 1 - 3KG;  CALD   ; SIGN   ; LOADED ;        ; STABLE ; PRIMARY;
      ;--------------------------------------------------------------------------
      ;                    R3 - BALANCE STATUS REGISTER
      ;--------------------------------------------------------------------------
      ;   PC   ;JEWELRY ; CUSTOM ; PARTS  ;  DF2   ;  DF1   ; 00=G    01=OZ   ;
      ; ACTIVE ; ENABLE ; ENABLE ; ENABLE ;        ;        ; 10=DWT  11=%,PC ;
      ;--------------------------------------------------------------------------
      ;                R30 - PARTS COUNT STATUS & CUSTOM D.F. LOC
      ;--------------------------------------------------------------------------
      ;        ;  A/D   ; SAMPLE ; SAMPLE ; CUSTOM ; CUSTOM ; SAMPLE ;CONTANER;
      ;        ; ERROR  ;   20   ;   10   ;  DF2   ;  DF1   ;   5    ;  TARED ;
      ;--------------------------------------------------------------------------
      $      EJECT
      ;--------------------------------------------------------------------------
      ;R6F-                                      ;R7F-
      ;R6E-                                      ;R7E-
      ;R6D-                                      ;R7D-
      ;R6C-                                      ;R7C-
      ;R6B-                                      ;R7B-
      ;R6A-                                      ;R7A-
      ;R69-                                      ;R79-
      ;R68-                                      ;R78-
      ;R67-                                      ;R77-
```

APPENDIX I

```
LOC  OBJ          LINE          SOURCE STATEMENT

 ;R66=                                  ;R76=
 ;R65=                                  ;R75=
 ;R64=                                  ;R74=
 ;R63=                                  ;R73=
 ;R62=                                  ;R72=
 ;R61=                                  ;R71=
 ;R60=                                  ;R70=
 ;----------------------------------------------------------------------------------------------
 ;R4F= JEWELRY ERROR HI                 ;R5F=
 ;R4E= JEWELRY ERROR LO                 ;R5E=
 ;R4D= GRAMS ERROR  HI                  ;R5D=
 ;R4C= GRAMS ERROR  LO                  ;R5C=
 ;R4B= CUSTOM ERROR HI                  ;R5B=
 ;R4A= CUSTOM ERROR LO                  ;R5A=
 ;R49= CUSTOM DIV  HI                   ;R59=
 ;R48= CUSTOM DIV  LO                   ;R58= SCRATCH
 ;R47= CUSTOM MULT HI                   ;R57= SCRATCH
 ;R46= CUSTOM MULT LO                   ;R56= AVERAGING SUM     MS
 ;R45= 10K DIVIDER HI                   ;R55=
 ;R44= 10K DIVIDER LO                   ;R54=
 ;R43= DWT CONV HI                      ;R53= AVERAGING SUM     LS
 ;R42= DWT CONV  LO                     ;R52= ERROR COMPUTATION  HI
 ;R41= OUNCE CONVERSION HI              ;R51= ERROR COMPUTATION  LO
 ;R40= OUNCE CONVERSION LO              ;R50= CUSTOM DECIMAL POINT FLAG REGISTER
 ;----------------------------------------------------------------------------------------------
 ;R2F= OLD AVERAGING COUNTER            ;R3F= FLAG REGISTER
 ;R2E= AVERAGING CONSTANT               ;R3E= SPAN CALIBRATION
 ;R2D= W.A.T.                           ;R3D= SPAN CAL  <LS>
 ;R2C= W.A.T.<LS>                       ;R3C= AVERAGE <MS>
 ;R2B= MULTIPLY                         ;R3B= AVERAGE
 ;R2A=                                  ;R3A= AVERAGE
 ;R29=     &                            ;R39= YTEMP STORAGE
 ;R28=                                  ;R38= YTEMP STORAGE
 ;R27=                                  ;R37= XTEMP STORAGE
 ;R26= DIVIDE MEMORY LOCATIONS          ;R36= XTEMP STORAGE
 ;R25= STABILITY <MS>                   ;R35= DATA1   <MS>
 ;R24= STABILITY <LS>                   ;R34= DATA1
 ;R23= TARE <MS>                        ;R33= DATA1   <LS>
 ;R22= TARE <LS>                        ;R32= BCD <MS>
 ;R21= AVERAGING COUNTER                ;R31= BCD
 ;R20= AUTO TURN OFF COUNTER            ;R30= BCD <LS>
 ;----------------------------------------------------------------------------------------------
 $        EJECT
```

APPENDIX I

```
LOC  OBJ        LINE         SOURCE STATEMENT
0000             66           ORG 0000H
0000 15          67           DIS I
0001 0409        68           JMP PWRUP
0003             69           ORG 0003H
0003 93          70           RETR
0007             71           ORG 0007H
0007 A48C        72           JMP TIMINT;          TIMER INTERRUPT VECTOR
0009 8ABF        73 PWRUP:    ORL P2,#0BFH;     SET PORT 2 TO INPUT PORT
000B 9ABF        74           ANL P2,#0BFH
000D 89FF        75           ORL P1,#0FFH;     SET PORT 1 TO INPUT PORT
000F 23E0        76           MOV A,#0E0H
0011 02          77           OUTL BUS,A
0012 23F3        78           MOV A,#0F3H
0014 62          79           MOV T,A
0015 B820        100          MOV R0,#20H
0017 BA5A        101          MOV R2,#5AH
0019 F464        102          CALL CLRDAT;      CLEAR DATA MEMORY
001B C5          103          SEL RB0
001C A5          104          CLR F1
001D B5          105          CPL F1;           SET NOT NEW DATA FLAG
001E 85          106          CLR F0
001F BC08        107          MOV R4,#008H;     PRESET SPAN ADJUSTMENT
0021 BD32        108          MOV R5,#032H;     AND SPAN VARIABLE
0023 B820        109          MOV R0,#20H
0025 B05A        110          MOV @R0,#05AH;    SET AUTO SHUT-OFF COUNTER
0027 D5          111          SEL RB1
0028 BD04        112          MOV R5,#04H
002A 25          113          EN TCNTI
002B 55          114          STRT T
002C F4C4        115          CALL TURNON
002E 99BF        116          ANL P1,#0BFH;     READ EAROM ARRAY INTO DATA MEMORY
0030 89FF        117          ORL P1,#0FFH
0032 B800        118          MOV R0,#00H
0034 B93D        119          MOV R1,#3DH
0036 BA02        120          MOV R2,#02H;      PRESET SPAN CONSTANT  ( READ EAROM HERE INSTEAD )
0038 F46A        121          CALL ROMRD
003A B802        122          MOV R0,#02H
003C B936        123          MOV R1,#36H
003E BA02        124          MOV R2,#02H;      PRESET INITIAL ZERO TARE (CALIBRATION X-DATA)
0040 F46A        125          CALL ROMRD
0042 B840        126          MOV R0,#40H;      PRESET CONVERSION FACTORS
0044 BA0F        127          MOV R2,#0FH
0046 B9D6        128          MOV R1,#LOW PRESET
0048 F9          129 DATINT:  MOV A,R1
0049 E3          130          MOVP3 A,@A
004A A0          131          MOV @R0,A
```

APPENDIX I

```
LOC  OBJ        LINE          SOURCE STATEMENT
0048 19          132           INC R1
004C 18          133           INC R0
004D EA48        134           DJNZ R2,DATINT
004F B81E        135           MOV R0,#1EH
0051 B960        136           MOV R1,#60H
0053 BA02        137           MOV R2,#02H
0055 F46A        138           CALL RDWRD
0057 B861        139           MOV R0,#61H
0059 F0          140           MOV A,@R0
005A 537F        141           ANL A,#7FH
005C AB          142           MOV R3,A
005D F0          143           MOV A,@R0
005E 37          144           CPL A
005F F265        145           JB7 SKIP1
0061 FD          146           MOV A,R5
0062 4340        147           ORL A,#40H
0064 AD          148           MOV R5,A
0065 C8          149 SKIP1:    DEC R0
0066 B950        150           MOV R1,#50H
0068 F0          151           MOV A,@R0
0069 530C        152           ANL A,#0CH
006B A1          153           MOV @R1,A
006C F0          154           MOV A,@R0;        SET AVERAGING CONSTANT
006D 47          155           SWAP A
006E 530F        156           ANL A,#0FH
0070 9673        157           JNZ SETAVG
0072 17          158           INC A
0073 B921        159 SETAVG:   MOV R1,#21H
0075 A1          160           MOV @R1,A
0076 B92E        161           MOV R1,#2EH
0078 A1          162           MOV @R1,A
0079 19          163           INC R1
007A A1          164           MOV @R1,A
007B B818        165           MOV R0,#18H
007D B946        166           MOV R1,#46H
007F BA06        167           MOV R2,#06H
0081 F46A        168           CALL RDWRD
0083 F4CD        169           CALL TRNOFF
0085 D461        170           CALL CLEAR
0087 F4BC        171           CALL DBTS
0089 BA00        172           MOV R2,#000H
008B F4B3        173 SEGTST:   CALL DEBUNC;      ALLOW LIGHTS TIME TO DISPLAY
008D EA8B        174           DJNZ R2,SEGTST
008F 46D0        175 PAUSE:    JNT1 NOTAKE;      TEST TAKE SWITCH
0091 F4B3        176           CALL DEBUNC
```

APPENDIX I

```
LOC  OBJ         LINE          SOURCE STATEMENT

0093 46D0         177           JNT1 NOTAKE
0095 FD           178           MOV A,R5
0096 4304         179           ORL A,#004H;      SET TAKE FLAG
0098 AD           180           MOV R5,A
0099 B820         181           MOV R0,#20H;      RESET AUTO SHUT-OFF COUNTER
009B B03C         182           MOV @R0,#3CH
009D 0A           183 CALENT:   IN A,P2;          TEST FOR CAL ENABLE
009E F2B8         184           JB7 WAIT11;       CAL NOT ENABLED
00A0 BA02         185           MOV R2,#02H
00A2 BF9E         186           MOV R7,#9EH
00A4 46D0         187 SPNTST:   JNT1 NOTAKE;      TEST FOR SPAN CALIBRATION REQUEST
00A6 0A           188           IN A,P2
00A7 37           189           CPL A
00A8 B2E1         190           JB5 RANGEJ;       TEST FOR RANGE CHANGE REQUEST
00AA F4B3         191           CALL DEBUNC
00AC EFA4         192           DJNZ R7,SPNTST
00AE EAA4         193           DJNZ R2,SPNTST
00B0 FD           194           MOV A,R5
00B1 4320         195           ORL A,#020H
00B3 53FB         196           ANL A,#0FBH
00B5 AD           197           MOV R5,A
00B6 D4EE         198           CALL CALOVR
00B8 0A           199 WAIT11:   IN A,P2
00B9 37           200           CPL A
00BA B2E1         201           JB5 RANGEJ
00BC 56B8         202           JT1 WAIT11
00BE FD           203           MOV A,R5
00BF 37           204           CPL A
00C0 F2D0         205           JB7 NOTAKE
00C2 B821         206           MOV R0,#21H
00C4 B002         207           MOV @R0,#02H
00C6 B82F         208           MOV R0,#2FH
00C8 B002         209           MOV @R0,#02H
00CA B853         210           MOV R0,#53H
00CC BA04         211           MOV R2,#04H
00CE F464         212           CALL CLRDAT
00D0 0A           213 NOTAKE:   IN A,P2;          TEST FOR OFF SWITCH
00D1 B2DF         214           JB5 NOOFFJ
00D3 F4B3         215           CALL DEBUNC
00D5 0A           216           IN A,P2
00D6 B2DF         217           JB5 NOOFFJ
00D8 0A           218 WAIT20:   IN A,P2
00D9 B2E5         219           JB5 OFFGO
00DB 56E1         220           JT1 RANGEJ
00DD 04D8         221           JMP WAIT20
```

APPENDIX I

```
LOC  OBJ     SOURCE STATEMENT

00DF 2494    NOOFFJ:  JMP NOOFF;    ######################################################################
00E1 2413    RANGEJ:  JMP RANGE;    ######################################################################
00E3 2404    ADV1J:   JMP ADV1;     ######################################################################
00E5 8408    OFFGO:   JMP OFF
00E7 FB      PARTSA:  MOV A,R3
00E8 4383             ORL A,#083H;  SET MODE AND PC ACTIVE FLAGS
00EA 53F3             ANL A,#0F3H
00EC AB               MOV R3,A
00ED B850             MOV R0,#50H
00EF FD               MOV A,R5
00F0 37               CPL A
00F1 F2FF             JB7 ADVANC
00F3 37               CPL A
00F4 537F             ANL A,#07FH;  CLEAR SAMPLE FLAG
00F6 AD               MOV R5,A
00F7 F0      PARTSB:  MOV A,@R0
00F8 53CC             ANL A,#0CCH;  CLEAR PC MODE FLAGS
00FA A0               MOV @R0,A
00FB D4C6    CONA:    CALL CONDSP
00FD 248E             JMP RNGDON
00FF F0      ADVANC:  MOV A,@R0
0100 1204             JB0 ADV1
0102 04FB             JMP CONA
0104 320A    ADV1:    JB1 ADV2
0106 4302             ORL A,#02H
0108 240E             JMP ADV3
010A 9211    ADV2:    JB4 PARTBJ
010C 4310             ORL A,#10H
010E A0      ADV3:    MOV @R0,A
010F 246A             JMP RNGDSP
0111 04F7    PARTBJ:  JMP PARTSB
0113 FD      RANGE:   MOV A,R5
0114 53DB             ANL A,#0DBH;  CLEAR TARE AND SPAN CALIBRATION FLAGS
0116 AD               MOV R5,A
0117 F4B3             CALL DEBONC
0119 0A               IN A,P2
011A B2B5             JB5 PAUSEJ
011C 46B5             JNT1 PAUSEJ
011E FB               MOV A,R3
011F 5370             ANL A,#070H
0121 C66A             JZ RNGDSP
0123 9244             JB4 PARTAJ
0125 FB               MOV A,R3
0126 123A             JB0 TSTB1
0128 3246             JB1 DWTRNG
```

APPENDIX I

```
LOC  OBJ         LINE          SOURCE STATEMENT

012A D25F         267           JB6  SETDZ;        CURRENTLY IN GRAM MODE
012C B850         268 SETCSM:   MOV  R0,#50H;      SWITCH TO CUSTOM MODE
012E F0           269           MOV  A,@R0
012F 530C         270           ANL  A,#0CH
0131 4303         271           ORL  A,#03H
0133 2B           272           XCH  A,R3
0134 53F0         273           ANL  A,#0F0H
0136 4B           274           ORL  A,R3
0137 AB           275           MOV  R3,A
0138 246A         276 RNGDJ:    JMP  RNGDSP
013A 3248         277 TSTB1:    JB1  SETGRM
013C FB           278 SETDWT:   MOV  A,R3;         CURRENTLY IN DZ MODE
013D 53FC         279           ANL  A,#0FCH;      SWITCH TO DWT MODE
013F 4302         280           ORL  A,#02H
0141 AB           281           MOV  R3,A
0142 244C         282           JMP  GRAMSA;       JUMP TO SET DP POINTS
0144 04E7         283 PARTAJ:   JMP  PARTSA;       ##################################
0146 B22C         284 DWTRNG:   JB5  SETCSM;       CURRENTLY IN DWT MODE
0148 FB           285 SETGRM:   MOV  A,R3;         SWITCH TO GRAMS MODE
0149 53FC         286           ANL  A,#0FCH
014B AB           287           MOV  R3,A
014C FD           288 GRAMSA:   MOV  A,R5;         DETERMINE DP LOCATION
014D D257         289           JB6  SETDP0
014F 2304         290 SETDP1:   MOV  A,#04H;       SET DECIMAL POINTS
0151 2458         291           JMP  DPSET
0153 2308         292 SETDP2:   MOV  A,#08H
0155 2458         293           JMP  DPSET
0157 27           294 SETDP0:   CLR  A
0158 2B           295 DPSET:    XCH  A,R3
0159 53F3         296           ANL  A,#0F3H
015B 4B           297           ORL  A,R3
015C AB           298           MOV  R3,A
015D 246A         299           JMP  RNGDSP
015F FB           300 SETDZ:    MOV  A,R3
0160 53FC         301           ANL  A,#0FCH
0162 4301         302           ORL  A,#01H
0164 AB           303           MOV  R3,A
0165 FD           304           MOV  A,R5
0166 D24F         305           JB6  SETDP1
0168 2453         306           JMP  SETDP2
016A D461         307 RNGDSP:   CALL CLEAR;        DISP RANGE INDICATORS
016C BA01         308           MOV  R2,#01H
016E D46F         309           CALL BLTHL
0170 BA19         310           MOV  R2,#19H
```

APPENDIX I

```
LOC  OBJ        LINE          SOURCE STATEMENT

0172 D463       311           CALL BITLO
0174 FB         312           MOV A,R3
0175 5303       313           ANL A,#03H
0177 03E8       314           ADD A,#0E8H
0179 E3         315           MOVP3 A,@A
017A AA         316           MOV R2,A
017B FB         317           MOV A,R3
017C 5283       318           JB2 DP1DSP
017E 7287       319           JB3 DP2DSP
0180 27         320           CLR A
0181 2489       321           JMP RNGDEX
0183 2380       322 DP1DSP:   MOV A,#80H
0185 2489       323           JMP RNGDEX
0187 2340       324 DP2DSP:   MOV A,#40H
0189 4A         325 RNGDEX:   ORL A,R2
018A BA0C       326           MOV R2,#0CH
018C D441       327           CALL DISP1
018E 0A         328 RNGDUN:   IN A,P2
018F 37         329           CPL A
0190 B28E       330           JB5 RNGDUN;      WAIT TILL SWITCH RELEASE
0192 568E       331           JT1 RNGDUN
0194 76B5       332 NOOFF:    JF1 PAUSEJ
0196 B5         333           CPL F1
0197 BC06       334           MOV R4,#06H;     SHIFT A/D DATA TO PROPER SIZE
0199 B83A       335 ADMULT:   MOV R0,#3AH
019B BA03       336           MOV R2,#03H
019D F440       337           CALL SHIFTL
019F F6BA       338           JC ERRGO;        TEST FOR OVERFLOW
01A1 EC99       339           DJNZ R4,ADMULT
01A3 B850       340           MOV R0,#50H
01A5 F0         341           MOV A,@R0
01A6 D2B7       342           JB6 ADERRA
01A8 B83B       343           MOV R0,#3BH;     TEST FOR UNDER RANGE ERROR
01AA F0         344           MOV A,@R0
01AB 03DF       345           ADD A,#0DFH
01AD 18         346           INC R0
01AE F0         347           MOV A,@R0
01AF 13FC       348           ADDC A,#0FCH
01B1 F6BE       349           JC CALTST
01B3 D4DE       350           CALL ERDISP
01B5 048F       351 PAUSEJ:   JMP PAUSE
01B7 53BF       352 ADERRA:   ANL A,#0BFH;     CLEAR A/D ERROR FLAG
01B9 A0         353           MOV @R0,A
01BA D4D6       354 ERRGO:    CALL OVRERR;     OVERFLOW DISPLAY INDICATOR
01BC 048F       355           JMP PAUSE
```

APPENDIX I

```
LOC  OBJ                SOURCE STATEMENT

01BE B85A   CALTST: MOV R0,#5AH;     PERFORM AVERAGING
01C0 B953           MOV R1,#53H
01C2 BA03           MOV R2,#03H
01C4 BE53           MOV R6,#53H
01C6 D416           CALL DATA1
01C8 F1             MOV A,@R1
01C9 1300           ADDC A,#00H
01CB A1             MOV @R1,A
01CC B821           MOV R0,#21H
01CE F0             MOV A,@R0
01CF 07             DEC A
01D0 C6D5           JZ AVRGC
01D2 A0             MOV @R0,A
01D3 048F           JMP PAUSE
01D5 B853   AVRGC:  MOV R0,#53H
01D7 B926           MOV R1,#26H
01D9 BA04           MOV R2,#04H
01DB D42A           CALL DATMOV
01DD B92E   AVRGD:  MOV R1,#2EH
01DF FB             MOV A,R3
01E0 37             CPL A
01E1 F2EB           JB7 AVRGE
01E3 FD             MOV A,R5
01E4 37             CPL A
01E5 52EB           JB2 AVRGE
01E7 2302           MOV A,#02H
01E9 24EC           JMP AVRGF
01EB F1     AVRGE:  MOV A,@R1
01EC B921   AVRGF:  MOV R1,#21H
01EE A1             MOV @R1,A
01EF B92F           MOV R1,#2FH
01F1 21             XCH A,@R1
01F2 B957           MOV R1,#57H
01F4 A1             MOV @R1,A
01F5 19             INC R1
01F6 B100           MOV @R1,#00H
01F8 BF57           MOV R7,#57H
01FA D473           CALL DIVIDE
01FC B826           MOV R0,#26H
01FE B93A           MOV R1,#3AH
0200 BA03           MOV R2,#03H
0202 D42A           CALL DATMOV
0204 B853           MOV R0,#53H
0206 BA04           MOV R2,#04H
0208 F464           CALL CLRDAT
```

APPENDIX I

```
LOC  OBJ          LINE         SOURCE STATEMENT

020A FD            401 CALTA:  MOV A,R5
020B B20F          402         JB5 CALBRT;      TEST FOR CALIBRATION REQUEST
020D 4496          403         JMP NULIN
020F B83B          404 CALBRT: MOV R0,#3BH
0211 B92C          405         MOV R1,#2CH
0213 D428          406         CALL DAT1;       TRANSFER AD DATA TO W.A.T.
0215 9452          407         CALL STABLE
0217 FD            408         MOV A,R5
0218 7221          409         JB3 GETZ
021A D4E6          410         CALL CALD
021C FD            411         MOV A,R5
021D 523A          412         JB2 GETX
021F 048F          413 PJ2:    JMP PAUSE
0221 B830          414 GETZ:   MOV R0,#30H
0223 B000          415         MOV @R0,#00H
0225 18            416         INC R0
0226 B030          417         MOV @R0,#30H
0228 18            418         INC R0
0229 B000          419         MOV @R0,#00H
022B 94FF          420         CALL GRMDSP
022D B857          421         MOV R0,#57H;     REPLACE R5
022F F0            422         MOV A,@R0
0230 AD            423         MOV R5,A
0231 FD            424         MOV A,R5
0232 37            425         CPL A
0233 121F          426         JB0 PJ2;         TEST FOR STABILITY
0235 FD            427         MOV A,R5
0236 524B          428         JB2 GETZ1
0238 048F          429         JMP PAUSE
023A 37            430 GETX:   CPL A
023B 121F          431         JB0 PJ2;         TEST FOR STABILITY
023D FD            432         MOV A,R5
023E 53EB          433         ANL A,#0EBH
0240 4308          434         ORL A,#008H;     SET X DATA LOADED FLAG
0242 AD            435         MOV R5,A
0243 B83B          436         MOV R0,#3BH
0245 B936          437         MOV R1,#36H
0247 D428          438         CALL DAT1
0249 4421          439         JMP GETZ;        JUMP TO DISPLAY 3000 COUNTS
024B 53D3          440 GETZ1:  ANL A,#0D3H;        CLEAR TARE,SPAN ADJUST,AND X DATA RDY FLAG
024D AD            441         MOV R5,A
024E B83B          442         MOV R0,#3BH
0250 B938          443         MOV R1,#38H
0252 D428          444         CALL DAT1
0254 B838          445 KSPAN:  MOV R0,#38H
```

APPENDIX I

```
LOC  OBJ        LINE        SOURCE STATEMENT
0256 B936       446          MOV R1,#36H
0258 BA02       447          MOV R2,#02H
025A BE38       448          MOV R6,#38H
025C F44A       449          CALL SUBB;       SUBTRACT X FROM Y
025E B82A       450          MOV R0,#2AH
0260 B0E8       451          MOV @R0,#0E8H
0262 18         452          INC R0
0263 B003       453          MOV @R0,#003H
0265 B82A       454          MOV R0,#2AH
0267 B938       455          MOV R1,#38H
0269 F418       456          CALL MUL2X2;     MULTIPLY (Y-X) BY 10000
026B B838       457          MOV R0,#38H
026D B0B8       458          MOV @R0,#0B8H
026F 18         459          INC R0
0270 B00B       460          MOV @R0,#00BH
0272 BF38       461          MOV R7,#38H
0274 D473       462          CALL DIVIDE;     DIVIDE (Y-X)*10000 BY 3000
0276 B826       463          MOV R0,#26H
0278 B93D       464          MOV R1,#3DH
027A D426       465          CALL DAT1;       SAVE KSPAN
027C F4C4       466          CALL TURNON
027E B83D       467          MOV R0,#3DH
0280 B900       468          MOV R1,#00H
0282 BA02       469          MOV R2,#02H
0284 F488       470          CALL ROMWRT;     STORE KSPAN IN EAROM
0286 B836       471          MOV R0,#36H
0288 B902       472          MOV R1,#02H
028A BA02       473          MOV R2,#02H
028C F488       474          CALL ROMWRT
028E 997F       475          ANL P1,#07FH;    SEND STORE PULSE
0290 8980       476          ORL P1,#080H
0292 F4CD       477          CALL TRNOFF
0294 048F       478          JMP PAUSE
0296 B83B       479 NULIN;   MOV R0,#3BH;     TEST FOR OVERRANGE ERRORS
0298 B936       480          MOV R1,#36H
029A BA02       481          MOV R2,#02H
029C BE51       482          MOV R6,#51H
029E F44A       483          CALL SUBB
02A0 E6DE       484          JNC NUERR
02A2 B851       485          MOV R0,#51H
02A4 B92A       486          MOV R1,#2AH
02A6 B1E8       487          MOV @R1,#0E8H
02A8 19         488          INC R1
02A9 B103       489          MOV @R1,#03H
02AB C9         490          DEC R1
02AC F418       491          CALL MUL2X2
```

APPENDIX I

```
LOC  OBJ         LINE         SOURCE STATEMENT
02AE BF3D         492          MOV R7,#3DH
02B0 D473         493          CALL DIVIDE
02B2 FB           494          MOV A,R3
02B3 F2CE         495          JB7 GRERR
02B5 5303         496          ANL A,#03H
02B7 C6CE         497          JZ GRERR;          WHAT MODE IS SCALE IN
02B9 37           498          CPL A
02BA 5303         499          ANL A,#03H
02BC C6C8         500          JZ CUSPOS
02BE B94E         501 JWLRY;   MOV R1,#4EH;       JEWELRY MODE
02C0 B173         502          MOV @R1,#73H
02C2 19           503          INC R1
02C3 B10C         504          MOV @R1,#0CH
02C5 C9           505          DEC R1
02C6 44D0         506          JMP ERRSUB
02C8 B94A         507 CUSPOS;  MOV R1,#4AH;       CUSTOM MODE
02CA 44D0         508          JMP ERRSUB
02CC 640C         509 PROJ;    JMP PROCES;        ###############################################################
02CE B94C         510 GRERR;   MOV R1,#4CH
02D0 B826         511 ERRSUB;  MOV R0,#26H
02D2 BA02         512          MOV R2,#02H
02D4 BE51         513          MOV R6,#51H
02D6 F44A         514          CALL SUBB
02D8 E6DE         515          JNC NOERR
02DA D4D6         516          CALL OVRERR
02DC 048F         517          JMP PAUSE
02DE FD           518 NOERR;   MOV A,R5
02DF F2E4         519          JB7 NOERRA;        IF SAMPLE SET PROCEED
02E1 FB           520          MOV A,R3
02E2 F2F4         521          JB7 NORML;         IF NO SAMPLE IS SET AND PC MODE IS ACTIVE SKIP TARE
02E4 FD           522 NOERRA;  MOV A,R5;          TEST FOR TARE REQUEST
02E5 37           523          CPL A
02E6 52F4         524          JB2 NORML;         NO TARE REQUEST
02E8 12F4         525          JB0 NORML;         NOT STABLE, DONT TARE
02EA 37           526          CPL A
02EB 53FB         527          ANL A,#0FBH;       CLEAR TARE FLAG
02ED AD           528          MOV R5,A
02EE B83B         529          MOV R0,#3BH
02F0 B922         530          MOV R1,#22H
02F2 D453         531          CALL COMP25;       TRANSFER AVERAGE REGISTERS TO TARE REGISTERS
02F4 FD           532 NORML;   MOV A,R5;          CLEAR MINUS SIGN
02F5 53EF         533          ANL A,#0EFH
02F7 AD           534          MOV R5,A
02F8 B822         535          MOV R0,#22H
02FA B93B         536          MOV R1,#3BH
```

APPENDIX I

```
LOC  OBJ        LINE           SOURCE STATEMENT

02FC B82C        537           MOV R6,#2CH;      ADD AVERAGE TO TARE
02FE D414        538           CALL DATADD
0300 F60C        539           JC PROCES;        TEST FOR NEGATIVE RESULT
0302 B92C        540           MOV R1,#2CH
0304 B82C        541           MOV R0,#2CH
0306 D453        542           CALL COMP2S
0308 FD          543           MOV A,R5
0309 4310        544           ORL A,#010H;      SET MINUS SIGN
030B AD          545           MOV R5,A
030C FB          546  PROCES:  MOV A,R3
030D 37          547           CPL A
030E F23F        548           JB7 NURMAJ;       TEST FOR PC MODE
0310 B82C        549           MOV R0,#2CH;      PC MODE STARTS HERE
0312 B92A        550           MOV R1,#2AH
0314 B110        551           MOV @R1,#10H
0316 19          552           INC R1
0317 B127        553           MOV @R1,#27H
0319 C9          554           DEC R1
031A F418        555           CALL MUL2X2
031C BF3D        556           MOV R7,#3DH
031E D473        557           CALL DIVIDE
0320 B826        558           MOV R0,#26H
0322 B92C        559           MOV R1,#2CH
0324 BA02        560           MOV R2,#02H
0326 D42A        561           CALL DATMOV;      WAT REGISTER NOW HAS GRAM WEIGHT X 10
0328 9452        562           CALL STABLE;      MAINTAIN STABILITY BASED ON 10 MILLIGRAM DIGIT
032A FD          563           MOV A,R5
032B F2B0        564           JB7 CALCNT
032D FD          565           MOV A,R5
032E 53EF        566           ANL A,#0EFH
0330 AD          567           MOV R5,A;         CLEAR MINUS SIGN DURING PC HOUSEKEEPING
0331 B850        568           MOV R0,#50H
0333 F0          569           MOV A,@R0
0334 1254        570           JB0 TSTSET
0336 FD          571           MOV A,R5
0337 5243        572           JB2 TARCON
0339 D406        573           CALL CONDSP
033B 048F        574           JMP PAUSE
033D 646D        575  SETCJ:   JMP SETCNT;       ################################################################
033F 64C8        576  NURMAJ:  JMP CRUNCH;       ################################################################
0341 246A        577  NOCON:   JMP RNGDSP
0343 37          578  TARCON:  CPL A
0344 1241        579           JB0 NOCON;        DONT TARE CONTAINER IF NOT STABLE
0346 FD          580           MOV A,R5
0347 53FB        581           ANL A,#0FBH;      CLEAR TARE FLAG
```

APPENDIX I

```
LOC  OBJ        LINE          SOURCE STATEMENT
0349 AD          582           MOV R5,A
034A F0          583           MOV A,@R0
034B 4301        584           ORL A,#01H
034D A0          585           MOV @R0,A
034E B83B        586           MOV R0,#3BH
0350 B922        587           MOV R1,#22H
0352 D453        588           CALL COMP2S
0354 FD          589 TSTSET;   MOV A,R5
0355 523D        590           JB2 SETJ;          TEST FOR PARTS COUNT SET SITUATION
0357 B850        591           MOV R0,#50H
0359 F0          592           MOV A,@R0
035A BC00        593           MOV R4,#00H
035C BEEC        594           MOV R6,#0ECH
035E 37          595           CPL A
035F 3269        596           JB1 CNTDSP
0361 BC18        597           MOV R4,#18H
0363 BE7E        598           MOV R6,#07EH
0365 9269        599           JB4 CNTDSP
0367 BCB6        600           MOV R4,#0B6H
0369 D4D2        601 CNTDSP;   CALL PCCNT
036B 048F        602           JMP PAUSE
036D FD          603 SETCNT;   MOV A,R5
036E 37          604           CPL A
036F 1241        605           JB0 NOCUN;         DONT SET PIECE COUNT IF UNSTABLE
0371 B822        606           MOV R0,#22H;       SET PARTS COUNTING CONSTANT
0373 B93B        607           MOV R1,#3BH
0375 BE57        608           MOV R6,#57H
0377 D414        609           CALL DATADD;       SUBTRACT TARE VALUE   2 BYTES
0379 F67F        610           JC SETC1
037B D4DE        611 TROUBL;   CALL ERDISP
037D 048F        612           JMP PAUSE
037F B82C        613 SETC1;    MOV R0,#2CH
0381 B92A        614           MOV R1,#2AH
0383 B10A        615           MOV @R1,#0AH
0385 19          616           INC R1
0386 B100        617           MOV @R1,#00H;      PRELOAD GRAMS TIMES 10 VALUE
0388 C9          618           DEC R1
0389 F418        619           CALL MUL2X2
038B B850        620           MOV R0,#50H
038D F0          621           MOV A,@R0
038E 37          622           CPL A
038F BA05        623           MOV R2,#05H
0391 3299        624           JB1 SETC2
0393 BA0A        625           MOV R2,#0AH
0395 9299        626           JB4 SETC2
```

APPENDIX I

```
LOC  OBJ        LINE          SOURCE STATEMENT

0397 BA14        627          MOV R2,#14H
0399 B857        628 SETC2:   MOV R0,#57H
039B FA          629          MOV A,R2
039C A0          630          MOV @R0,A
039D 18          631          INC R0
039E B000        632          MOV @R0,#00H
03A0 BF57        633          MOV R7,#57H
03A2 D473        634          CALL DIVIDE
03A4 B826        635          MOV R0,#26H
03A6 B946        636          MOV R1,#46H
03A8 D428        637          CALL DAT1
03AA FD          638          MOV A,R5
03AB 53FB        639          ANL A,#0FBH
03AD 4380        640          ORL A,#080H
03AF AD          641          MOV R5,A
03B0 B82C        642 CALCNT:  MOV R0,#2CH
03B2 B92A        643          MOV R1,#2AH
03B4 B10A        644          MOV @R1,#0AH
03B6 19          645          INC R1
03B7 B100        646          MOV @R1,#00H;   PRELOAD WEIGHT IN GRAMS TIMES 10 DATA
03B9 C9          647          DEC R1
03BA F418        648          CALL MUL2X2
03BC BF46        649          MOV R7,#46H
03BE D473        650          CALL DIVIDE;    DIVIDE BY PIECE WEIGHT
03C0 B826        651          MOV R0,#26H
03C2 B92C        652          MOV R1,#2CH
03C4 D428        653          CALL DAT1
03C6 8443        654          JMP CLRZER
03C8 B82C        655 CRUNCH:  MOV R0,#2CH;    DIVIDE DATA BY RSPAN
03CA B92A        656          MOV R1,#2AH
03CC B1E8        657          MOV @R1,#0E8H
03CE 19          658          INC R1
03CF B103        659          MOV @R1,#03H
03D1 C9          660          DEC R1
03D2 F418        661          CALL MUL2X2
03D4 BF3D        662          MOV R7,#3DH
03D6 8400        663          JMP DIVDAT
0400             664          ORG 0400H;      ORG FAST LOOKUP TABLES    ******************************
0400 D473        665 DIVDAT:  CALL DIVIDE
0402 B826        666          MOV R0,#26H
0404 B92C        667          MOV R1,#2CH
0406 BA02        668          MOV R2,#02H
0408 D42A        669          CALL DATMOV
040A B82C        670          MOV R0,#2CH;    TEST FOR CONVERSION FACTORS
040C FB          671          MOV A,R3
```

APPENDIX I

```
LOC  OBJ        LINE         SOURCE STATEMENT

040D 5303        672          ANL A,#03H
040F C641        673          JZ STABL;            GRAMS MODE
0411 3217        674          JB1 NOTOZ
0413 B940        675          MOV R1,#40H;         OUNCES
0415 8429        676          JMP CONVRT
0417 121D        677  NOTOZ:  JB0 CUSTOM
0419 B942        678          MOV R1,#42H;         DWT
041B 8429        679          JMP CONVRT
041D B946        680 CUSTOM:  MOV R1,#46H;         CUSTOM CONVERSION FACTOR
041F FB          681          MOV A,R3
0420 37          682          CPL A
0421 9229        683          JB4 CONVRT
0423 B10A        684          MOV @R1,#0AH
0425 19          685          INC R1
0426 B100        686          MOV @R1,#00H
0428 C9          687          DEC R1
0429 F418        688 CONVRT:  CALL MUL2X2
042B FB          689          MOV A,R3
042C 37          690          CPL A
042D 5303        691          ANL A,#03H
042F 9635        692          JNZ CONVRB
0431 BF48        693          MOV R7,#48H;         CUSTOM DIVISOR
0433 8437        694          JMP CONVRC
0435 BF44        695 CONVRB:  MOV R7,#44H
0437 D473        696 CONVRC:  CALL DIVIDE
0439 B826        697          MOV R0,#26H
043B B92C        698          MOV R1,#2CH
043D BA02        699          MOV R2,#02H
043F D42A        700          CALL DATMOV
0441 9452        701 STABL:   CALL STABLE;         TEST STABILITY
0443 B82C        702 CLRZER:  MOV R0,#2CH;         CLEAR MINUS SIGN IF DATA IS ZERO
0445 F0          703          MOV A,@R0
0446 9650        704          JNZ BCDJ
0448 18          705          INC R0
0449 F0          706          MOV A,@R0
044A 9650        707          JNZ BCDJ
044C FD          708          MOV A,R5
044D 53EF        709          ANL A,#0EFH;         CLEAR MINUS SIGN
044F AD          710          MOV R5,A
0450 849B        711 BCDJ:    JMP BCDCLR
0452 B824        712 STABLE:  MOV R0,#24H;         CHECK STABILITY
0454 B92C        713          MOV R1,#2CH
0456 BE24        714          MOV R6,#24H
0458 BA02        715          MOV R2,#02H
045A F44A        716          CALL SUBB
045C F666        717          JC STABL;            TEST FOR NEGATIVE RESULT
```

APPENDIX I

```
LOC  OBJ         LINE        SOURCE STATEMENT

045E B824                    MOV R0,#24H
0460 B924                    MOV R1,#24H
0462 BA02                    MOV R2,#02H
0464 D455                    CALL COMP1
0466 B825           STAB1:   MOV R0,#25H
0468 F0                      MOV A,@R0
0469 9690                    JNZ NSTAB
046B C8                      DEC R0
046C BA02                    MOV R2,#02H
046E FD                      MOV A,R5
046F B279                    JB5 STAB0B;       TEST FOR CALIBRATION MODE
0471 FB                      MOV A,R3
0472 37                      CPL A
0473 F27B                    JB7 STAB0
0475 BA03                    MOV R2,#03H
0477 847B                    JMP STAB0
0479 BA10           STAB0B:  MOV R2,#010H;     SET STABILITY CRITERIA FOR RAW COUNT DATA (CALIBRATION)
047B F0             STAB0:   MOV A,@R0
047C C683           STAB0A:  JZ STAB1A
047E 07                      DEC A
047F EA7C                    DJNZ R2,STAB0A
0481 8490                    JMP NSTAB
0483 FD             STAB1A:  MOV A,R5
0484 328B                    JB1 STAB2
0486 4302                    ORL A,#02H;       SET STABILITY BIT 1
0488 AD                      MOV R5,A
0489 8494                    JMP STBRET
048B 4301           STAB2:   ORL A,#01H;       SET STABILITY BIT 0
048D AD                      MOV R5,A
048E 8494                    JMP STBRET
0490 FD             NSTAB:   MOV A,R5
0491 53FC                    ANL A,#0FCH;      CLEAR STABILITY BITS
0493 AD                      MOV R5,A
0494 B820           STBRET:  MOV R0,#20H;      SAVE W.A.T. IN STABILITY HOLDING REGISTERS
0496 B924                    MOV R1,#24H
0498 D428                    CALL DAT1
049A 83                      RET
                    ;;;;;;;;;;;;;;;;;;;; BINARY TO BCD CONVERSION ROUTINE ;;;;;;;;;;;;;;;;;;;;;;;;;;
                    ;
                    ;R30-R32=BCD REGISTERS
                    ;R1=LOWER 8 BITS BINARY
                    ;R2=UPPER 8 BITS BINARY
                    ;
049B B830           BCDCLR:  MOV R0,#030H;     CLEAR BCD REGISTERS
049D 27                      CLR A
```

APPENDIX I

```
LINE        SOURCE STATEMENT
049E A0                 MOV @R0,A
049F 18                 INC R0
04A0 A0                 MOV @R0,A
04A1 18                 INC R0
04A2 A0                 MOV @R0,A
04A3 B82C               MOV R0,#02CH;     INITIALIZE VALUES
04A5 F0                 MOV A,@R0
04A6 A9                 MOV R1,A
04A7 18                 INC R0
04A8 F0                 MOV A,@R0
04A9 AA                 MOV R2,A
04AA BC10               MOV R4,#10H;      # OF BITS IN BINARY NUMBER
04AC F9        CONBCD:  MOV A,R1;         BIN=2*BIN
04AD F7                 RLC A
04AE A9                 MOV R1,A
04AF FA                 MOV A,R2
04B0 F7                 RLC A
04B1 AA                 MOV R2,A
04B2 B830               MOV R0,#30H;      RESET POINTER TO LS PACKED BCD BYTE
04B4 BE03               MOV R6,#03H;      # OF PACKED BYTES
04B6 F0        BCDWC:   MOV A,@R0
04B7 70                 ADDC A,@R0;       BCD=(2*BCD)+CARRY FROM (BIN=2*BIN)
04B8 57                 DA A
04B9 A0                 MOV @R0,A
04BA 18                 INC R0
04BB EEB6               DJNZ R6,BCDWC
04BD ECAC               DJNZ R4,CONBCD
04BF B820      BCDLOD:  MOV R0,#20H
04C1 F0                 MOV A,@R0
04C2 07                 DEC A
04C3 96FA               JNZ LEVON
04C5 0A                 IN A,P2
04C6 92F8               JB4 LEVON1;       CHECK AUTO-SHUTOFF ENABLE
04C8 FB        OFF:     MOV A,R3
04C9 F2F6               JB7 OFFA
04CB F4C4               CALL TURNON
04CD B81F               MOV R0,#1FH
04CF B960               MOV R1,#60H
```

Appendix I

```
LOC  OBJ        LINE         SOURCE STATEMENT

04D1 BA01        801          MOV R2,#01H
04D3 F46A        802          CALL RUMKD
04D5 B860        803          MOV R0,#60H
04D7 F0          804          MOV A,@R0
04D8 530F        805          ANL A,#0FH
04DA AA          806          MOV R2,A
04DB FB          807          MOV A,R3
04DC 530F        808          ANL A,#0FH
04DE DA          809          XRL A,R2
04DF C6F6        810          JZ OFFA
04E1 F0          811          MOV A,@R0
04E2 53F0        812          ANL A,#0F0H
04E4 A0          813          MOV @R0,A
04E5 FB          814          MOV A,R3
04E6 530F        815          ANL A,#0FH
04E8 40          816          ORL A,@R0
04E9 A0          817          MOV @R0,A
04EA B91F        818          MOV R1,#1FH
04EC BA01        819          MOV R2,#01H
04EE F48B        820          CALL RUMWRT
04F0 997F        821          ANL P1,#07FH
04F2 8980        822          ORL P1,#080H
04F4 F4CD        823          CALL TRNOFF
04F6 8A40        824 OFFA:    ORL P2,#040H;   TURN BALANCE OFF IF NOT USED FOR 1 MINUTE
04F8 84F6        825          JMP OFFA
04FA A0          826 LEVON:   MOV @R0,A
04FB B40C        827 LEVON1:  CALL DISPLY
04FD 048F        828          JMP PAUSE
04FF B857        829 GRMDSP:  MOV R0,#57H
0501 FB          830          MOV A,R3
0502 A0          831          MOV @R0,A
0503 FD          832          MOV A,R5
0504 D20A        833          JB6 K3;         3 KILO OR 300
0506 2304        834          MOV A,#04H;     300
0508 A40B        835          JMP SETIT
050A 27          836 K3:      CLR A;          3 KILO
050B AB          837 SETIT:   MOV R3,A
050C 85          838 DISPLY:  CLR F0
050D B831        839          MOV R0,#31H
050F F0          840          MOV A,@R0
0510 47          841          SWAP A
0511 5303        842          ANL A,#03H
0513 03EC        843          ADD A,#0ECH
0515 E3          844          MOVP3 A,@A
0516 AF          845          MOV R7,A
0517 FB          846          MOV A,R3
```

APPENDIX I

```
LINE          SOURCE STATEMENT

0518 721F                JB3 LEDZA
051A F0                  MOV A,@R0
051B 761F                JNZ LEDZA
051D A425                JMP LEDZB
051F 95        LEDZA:    CPL F0
0520 F0                  MOV A,@R0
0521 530F                ANL A,#0FH
0523 D431                CALL SEVSEG
0525 AE        LEDZB:    MOV R6,A
0526 C8                  DEC R0
0527 B633                JF0 LEDZC
0529 FB                  MOV A,R3
052A 5233                JB2 LEDZC
052C F0                  MOV A,@R0
052D 53F0                ANL A,#0F0H
052F 9633                JNZ LEDZC
0531 A439                JMP LEDZD
0533 F0        LEDZC:    MOV A,@R0
0534 47                  SWAP A
0535 530F                ANL A,#0FH
0537 D431                CALL SEVSEG
0539 AC        LEDZD:    MOV R4,A
053A F0                  MOV A,@R0
053B 530F                ANL A,#0FH
053D D431                CALL SEVSEG
053F A9                  MOV R1,A
0540 FB                  MOV A,R3
0541 5303                ANL A,#03H
0543 03E8                ADD A,#0E8H
0545 E3                  MOVP3 A,@A
0546 AA                  MOV R2,A
0547 FD                  MOV A,R5
0548 124F                JB0 STABOK
054A FB                  MOV A,R3
054B F24F                JB7 STABOK;     DONT WORRY ABOUT STABILITY IN FC MODE
054D BA00                MOV R2,#00H
054F FD        STABOK:   MOV A,R5
0550 37                  CPL A
0551 9257                JB4 NOMIND
0553 FA                  MOV A,R2
0554 4301                ORL A,#01H;     SET MINUS SIGN
0556 AA                  MOV R2,A
0557 FB        NOMIND:   MOV A,R3
0558 525F                JB2 DP1
055A 7263                JB3 DP2
```

APPENDIX I

```
LOC  OBJ              SOURCE STATEMENT
055C 27                      CLR A
055D A465                    JMP LEDOUT
055F 2380          DF1;      MOV A,#80H
0561 A465                    JMP LEDOUT
0563 2340          DF2;      MOV A,#40H
0565 4A            LEDOUT;   ORL A,R2
0566 266A                    JNT0 LEDO1
0568 4304                    ORL A,#04H;       SET LO BATT INDICATOR
056A A8            LEDO1;    MOV R0,A
056B D461          DISPOK;   CALL CLEAR
056D BA01                    MOV R2,#01H
056F D46F                    CALL BITHI;       SEND START BIT
0571 F9                      MOV A,R1
0572 D437                    CALL DISP
0574 FC                      MOV A,R4
0575 D437                    CALL DISP
0577 FE                      MOV A,R6
0578 D437                    CALL DISP
057A BA04                    MOV R2,#04H
057C FD                      MOV A,R5
057D 5282                    JB2 NUMS
057F FF                      MOV A,R7
0580 A483                    JMP DISPMS
0582 27            NUMS;     CLR A
0583 D441          DISPMS;   CALL DISP1
0585 F8                      MOV A,R0
0586 BA0C                    MOV R2,#0CH
0588 D441                    CALL DISP1
                   ;----------------------------------------------------------------------
058A C412          TIMJ;     JMP TIMOUT;       ************************************************************
058C C5            TIMINT;   SEL RB0;          TIMER INTERRUPT
058D AB                      MOV R3,A
058E 23F1                    MOV A,#0F1H
0590 62                      MOV T,A
0591 1693                    JTF SOUT;         CLEAR TIMER OVERFLOW FLAG   (ERROR DETECTION)
0593 881C          SOUT;     ORL BUS,#01CH;    START OUTPUT PULSE
0595 1F            ADINC;    INC R7
0596 8695                    JNI ADINC
0598 98E3                    ANL BUS,#0E3H
059A 169E                    JTF TIMERR
059C A4A4                    JMP ADDUP
059E B850          TIMERR;   MOV R0,#050H
05A0 F0                      MOV A,@R0
05A1 4340                    ORL A,#040H
05A3 A0                      MOV @R0,A
05A4 B816          ADDUP;    MOV R0,#16H
```

Appendix I

```
LOC  OBJ          LINE         SOURCE STATEMENT
05A6 F0            938          MOV A,@R0
05A7 6F            939          ADD A,R7
05A8 A0            940          MOV @R0,A
05A9 18            941          INC R0
05AA F0            942          MOV A,@R0
05AB 1300          943          ADDC A,#00H
05AD A0            944          MOV @R0,A
05AE BF00          945          MOV R7,#00H
05B0 ED8A          946          DJNZ R5,TIMJ
05B2 BD19          947          MOV R5,#019H
05B4 ECC7          948 DATSAV:  DJNZ R4,DATRDY;  HAVE 16 INPUTS BEEN SUMMED YET?
05B6 BC10          949          MOV R4,#10H;     YES!
05B8 A5            950          CLR F1
05B9 B833          951          MOV R0,#33H
05BB B93A          952          MOV R1,#3AH
05BD BA03          953          MOV R2,#03H
05BF D42A          954          CALL DATMOV;     TRANSFER A/D INPUT TO PROCESS REGISTERS
05C1 B833          955          MOV R0,#33H
05C3 BA03          956          MOV R2,#03H
05C5 F464          957          CALL CLRDAT;     ERASE OLD A/D INPUT      - CLEAR SUMMER -
05C7 B814          958 DATRDY:  MOV R0,#14H
05C9 B933          959          MOV R1,#33H
05CB BE33          960          MOV R6,#33H
05CD D414          961          CALL DATADD;     ADD R(I-1) TO A/D SUMMER
05CF F1            962          MOV A,@R1
05D0 1300          963          ADDC A,#00H
05D2 A1            964          MOV @R1,A
05D3 E6DE          965          JNC OKOVR;       TEST FOR OVERFLOW ERROR
05D5 B833          966          MOV R0,#33H
05D7 23FF          967          MOV A,#0FFH
05D9 A0            968          MOV @R0,A
05DA 18            969          INC R0
05DB A0            970          MOV @R0,A
05DC 18            971          INC R0
05DD A0            972          MOV @R0,A
05DE B815          973 OKOVR:   MOV R0,#15H
05E0 F0            974          MOV A,@R0
05E1 AA            975          MOV R2,A
05E2 C8            976          DEC R0
05E3 F0            977          MOV A,@R0
05E4 A9            978          MOV R1,A
05E5 C8            979          DEC R0
05E6 F0            980          MOV A,@R0
05E7 BE03          981          MOV R6,#03H
05E9 97            982 DIV8:    CLR C;           DIVIDE R(I-1) BY 8
05EA 2A            983          XCH A,R2
```

APPENDIX I

```
LOC  OBJ             SOURCE STATEMENT

05EB 67                RRC A
05EC 2A                XCH A,R2
05ED 29                XCH A,R1
05EE 67                RRC A
05EF 29                XCH A,R1
05F0 67                RRC A
05F1 EEE9              DJNZ R6,DIV8
05F3 97                CLR C
05F4 A7                CPL C
05F5 B813              MOV R0,#13H;      SUBTRACT 1/8 R(I) FROM R(I)
05F7 37                CPL A
05F8 70                ADDC A,@R0
05F9 A0                MOV @R0,A
05FA 18                INC R0
05FB F9                MOV A,R1
05FC 37                CPL A
05FD 70                ADDC A,@R0
05FE A0                MOV @R0,A
05FF 18                INC R0
0600 FA                MOV A,R2
0601 37                CPL A
0602 70                ADDC A,@R0
0603 A0                MOV @R0,A
0604 B814              MOV R0,#14H;      R(I) = X(I) + (R(I-1)* 7/8)
0606 B916              MOV R1,#16H
0608 BE14              MOV R6,#14H
060A D414              CALL DATADD
060C B816              MOV R0,#16H
060E BA02              MOV R2,#02H
0610 F464              CALL CLRDAT;      CLEAR X(I)
0612 FB       TIMOUT:  MOV A,R3
0613 93                RETR
              ;
              ;;;;;;;;;;;;;; DATA MANIPULATION & GENERAL PURPOSE SUBROUTINES ;;;;;;;;;;;;;;;
0614 BA02     DATADD:  MOV R2,#02H;      ADD @R0 TO @R1 DESTINATION @R6(2 BYTES)
0616 97       DATA1:   CLR C
0617 F0       DATA2:   MOV A,@R0
0618 71                ADDC A,@R1
0619 28                XCH A,R0;         EXCHANGE R0 AND R6
061A 2E                XCH A,R6
061B 28                XCH A,R0
061C A0                MOV @R0,A
061D 18                INC R0
061E 28                XCH A,R0
061F 2E                XCH A,R6
0620 28                XCH A,R0
```

APPENDIX I

```
LOC  OBJ        LINE         SOURCE STATEMENT

0621 18         1030           INC R0
0622 19         1031           INC R1
0623 EA26       1032           DJNZ R2,DATA2J
0625 83         1033           RET
0626 C417       1034 DATA2J;   JMP DATA2
0628 BA02       1035 DAT1;     MOV R2,#02H
062A F0         1036 DATMOV;   MOV A,@R0;        MOV R2 BYTES FROM @R0 TO @R1
062B A1         1037           MOV @R1,A
062C 18         1038           INC R0
062D 19         1039           INC R1
062E EA2A       1040           DJNZ R2,DATMOV
0630 83         1041           RET
0631 530F       1042 SEVSEG;   ANL A,#0FH;       FETCH SEVEN-SEGMENT EQUIVALENT OF ACCUMULATOR
0633 03F0       1043           ADD A,#0F0H;      ADD OFFSET VALUE TO ACCUMULATOR
0635 E3         1044           MOVP3 A,@A
0636 83         1045           RET
0637 AA         1046 DISP;     MOV R2,A
0638 FD         1047           MOV A,R5
0639 37         1048           CPL A
063A 523E       1049           JB2 OKSTAB;       IF TARE IS IN PROGRESS, BLANK DISPLAY
063C BA00       1050           MOV R2,#00H
063E FA         1051 OKSTAB;   MOV A,R2
063F BA07       1052           MOV R2,#07H;      MOVE ACCUMULATOR TO SERIAL DISPLAY
0641 98FE       1053 DISP1;    ANL BUS,#0FEH;    CLEAR DATA BIT
0643 F7         1054           RLC A;            GET DISPLAY BIT INTO CARRY
0644 E648       1055           JNC XMIT
0646 8801       1056           ORL BUS,#01H;     SET DATA BIT
0648 00         1057 XMIT;     NOP
0649 8802       1058           ORL BUS,#02H;     PULSE CLOCK
064B 00         1059           NOP
064C 98FD       1060           ANL BUS,#0FDH;    CLEAR CLOCK LINE
064E EA41       1061           DJNZ R2,DISP1
0650 98FE       1062           ANL BUS,#0FEH;    CLEAR DATA LINE
0652 83         1063           RET
0653 BA02       1064 COMP2S;   MOV R2,#02H;      TAKE 2'S COMPLEMENT OF @R0 MOVE TO @R1  (R2 BYTES)
0655 97         1065 COMP1;    CLR C
0656 A7         1066           CPL C
0657 F0         1067 COMP2;    MOV A,@R0
0658 37         1068           CPL A
0659 1300       1069           ADDC A,#00H
065B A1         1070           MOV @R1,A
065C 19         1071           INC R1
065D 18         1072           INC R0
065E EA57       1073           DJNZ R2,COMP2
0660 83         1074           RET
0661 BA25       1075 CLEAR;    MOV R2,#025H;     CLEAR LCD DRIVER <MM5452 OR MM5453>
```

APPENDIX I

```
LINE          SOURCE STATEMENT

0663 98FE       1076 BITLO:   ANL BUS,#0FEH;    DATA LINE =0
0665 8802       1077 CLEAR1:  ORL BUS,#002H;    PULSE CLOCK
0667 00         1078          NOP
0668 98FC       1079          ANL BUS,#0FCH
066A EA65       1080          DJNZ R2,CLEAR1
066C 83         1081          RET
066D BA25       1082 EIGHTS:  MOV R2,#025H;
066F 8801       1083 BITHI:   ORL BUS,#01H;     SET DATA LINE
0671 C465       1084          JMP CLEAR1
0673 B82A       1085 DIVIDE:  MOV R0,#2AH;      32 BIT DIVISION ROUTINE
0675 BA02       1086          MOV R2,#02H
0677 F464       1087          CALL CLRDAT
0679 BC21       1088          MOV R4,#21H;      DIVIDE 26-29 BY @R7  2 BYTES
067B EC9E       1089 DIVA:    DJNZ R4,DIVB;     LOC 26-2B DESTROYED, QUOTIENT AT 26 4 BYTES
067D B82A       1090          MOV R0,#2AH;      DIVISION COMPLETE, TEST REMAINDER FOR ROUNDUP
067F BA02       1091          MOV R2,#02H
0681 F440       1092          CALL SHIFTL
0683 F692       1093          JC INCREM;        REMAINDER IS MORE THAN .5 @R7
0685 FF         1094          MOV A,R7
0686 A9         1095          MOV R1,A
0687 B82A       1096          MOV R0,#2AH
0689 A9         1097          MOV R1,A
068A BA02       1098          MOV R2,#02H
068C BE2A       1099          MOV R6,#2AH
068E F44A       1100          CALL SUBB
0690 E69D       1101          JNC DIVRET;       TEST REMAINDER
0692 B826       1102 INCREM:  MOV R0,#26H;      INCREMENT QUOTIENT FOR ROUNDUP
0694 BA04       1103          MOV R2,#04H
0696 F0         1104 REMINC:  MOV A,@R0
0697 1300       1105          ADDC A,#00H
0699 A0         1106          MOV @R0,A
069A 18         1107          INC R0
069B EA96       1108          DJNZ R2,REMINC
069D 83         1109 DIVRET:  RET
069E B826       1110 DIVB:    MOV R0,#26H
06A0 BA06       1111          MOV R2,#06H
06A2 F440       1112          CALL SHIFTL
06A4 F6B7       1113          JC DIVD
06A6 B82A       1114          MOV R0,#2AH
06A8 FF         1115          MOV A,R7
06A9 A9         1116          MOV R1,A
06AA BA02       1117          MOV R2,#02H
06AC 97         1118          CLR C
06AD A7         1119          CPL C
06AE F1         1120 DIVC:    MOV A,@R1
```

APPENDIX I

```
LOC  OBJ            SOURCE STATEMENT

06AF 37                     CPL A
06B0 70                     ADDC A,@R0
06B1 18                     INC R0
06B2 19                     INC R1
06B3 EAAE                   DJNZ R2,DIVC
06B5 E67B                   JNC DIVA
06B7 B82A           DIVD:   MOV R0,#2AH
06B9 FF                     MOV A,R7
06BA A9                     MOV R1,A
06BB BA02                   MOV R2,#02H
06BD BE2A                   MOV R6,#2AH
06BF F44A                   CALL SUBB
06C1 B826                   MOV R0,#26H
06C3 10                     INC @R0
06C4 C47B                   JMP DIVA
06C6 BC66           CONDSP: MOV R4,#66H;    DISPLAY CONTAINER TARE PROMPTER  ( PC MODE )
06C8 BE8E                   MOV R6,#8EH
06CA BF8A                   MOV R7,#8AH
06CC C4F4                   JMP ALPHA
06CE BCF2           PCDSP:  MOV R4,#0F2H;   DISPLAY SAMPLE ACKNOWLEDGE       ( PC MODE )
06D0 BE66                   MOV R6,#66H
06D2 BF00           PCCNT:  MOV R7,#00H
06D4 C4F4                   JMP ALPHA
06D6 BCE6           OVRERR: MOV R4,#0E6H;   DISPLAY OVERFLOW ERROR INDICATOR
06D8 BEE6                   MOV R6,#0E6H
06DA BFE6                   MOV R7,#0E6H
06DC C4F4                   JMP ALPHA
06DE BC80           ERDISP: MOV R4,#80H;    DISPLAY ERROR MESSAGE
06E0 BE80                   MOV R6,#80H
06E2 BF80                   MOV R7,#80H
06E4 C4F4                   JMP ALPHA
06E6 BC66           CALD:   MOV R4,#66H;    DISPLAY CALIBRATION INDICATOR
06E8 BEFA                   MOV R6,#0FAH
06EA BF46                   MOV R7,#46H
06EC C4F4                   JMP ALPHA
06EE BC80           CALOVR: MOV R4,#80H;    INDICATE CALIBRATION COMPLETE
06F0 BE66                   MOV R6,#66H
06F2 BF80                   MOV R7,#80H
06F4 D461           ALPHA:  CALL CLEAR;     DISPLAY ALPHA CHARACTERS IN R4,R6,R7
06F6 BA01                   MOV R2,#01H
06F8 2380                   MOV A,#080H
06FA D441                   CALL DISP1
06FC FF                     MOV A,R7
06FD AA                     MOV R2,A
06FE D43E                   CALL UKSTAB
0700 FE                     MOV A,R6
0701 AA                     MOV R2,A
```

APPENDIX I

```
LOC  OBJ                 SOURCE STATEMENT
0702 D43E                 CALL OKSTAB
0704 FC                   MOV A,R4
0705 AA                   MOV R2,A
0706 D43E                 CALL OKSTAB
0708 BA00                 MOV R2,#00H
070A D43E                 CALL OKSTAB
070C 2612                 JNT0 NOLOB;        TEST FOR LO BATTERY INDICATOR
070E 2320                 MOV A,#020H;       SET LOW BATT
0710 E413                 JMP DODSP
0712 27          NOLOB:   CLR A
0713 BA07        DODSP:   MOV R2,#07H
0715 D441                 CALL DISP1
0717 83                   RET
0718 F9          MUL2X2:  MOV A,R1;          MULTIPLY 2BYTE @R0 BY 2BYTE @R1 RESULT IN 40--43
0719 AF                   MOV R7,A
071A B926                 MOV R1,#26H
071C BA02                 MOV R2,#02H
071E D42A                 CALL DATMOV
0720 BA02                 MOV R2,#02H
0722 B828                 MOV R0,#28H
0724 F464                 CALL CLRDAT
0726 BC10                 MOV R4,#10H
0728 B926        MULA:    MOV R1,#26H
072A F1                   MOV A,@R1
072B 37                   CPL A
072C 97                   CLR C
072D 1237                 JB0 MULB
072F B828                 MOV R0,#28H
0731 FF                   MOV A,R7
0732 A9                   MOV R1,A
0733 BE28                 MOV R6,#28H
0735 D414                 CALL DATADD
0737 BA04        MULB:    MOV R2,#04H
0739 B829                 MOV R0,#29H
073B F45D                 CALL SHFTR1
073D EC28                 DJNZ R4,MULA
073F 83                   RET
0740 97          SHIFTL:  CLR C
0741 F0          SHFTL1:  MOV A,@R0
0742 F7                   RLC A
0743 A0                   MOV @R0,A
0744 18                   INC R0
0745 EA48                 DJNZ R2,SHFTLJ
0747 83                   RET
0748 E441        SHFTLJ:  JMP SHFTL1
074A 97          SUBB:    CLR C
```

APPENDIX I

```
LOC  OBJ          LINE        SOURCE STATEMENT

074B A7           1214         CPL C
074C F1           1215 SUBB1:  MOV A,@R1;         SUBTRACT @R1 FROM @R0    R2 BYTES
074D 37           1216         CPL A
074E 70           1217         ADDC A,@R0
074F 28           1218         XCH A,R0
0750 2E           1219         XCH A,R6
0751 28           1220         XCH A,R0
0752 A0           1221         MOV @R0,A
0753 28           1222         XCH A,R0
0754 2E           1223         XCH A,R6
0755 28           1224         XCH A,R0
0756 18           1225         INC R0
0757 19           1226         INC R1
0758 1E           1227         INC R6
0759 EA4C         1228         DJNZ R2,SUBB1
075B 83           1229         RET
075C 97           1230 SHFTR2: CLR C
075D F0           1231 SHFTR1: MOV A,@R0
075E 67           1232         RRC A
075F A0           1233         MOV @R0,A
0760 C8           1234         DEC R0
0761 EA5D         1235         DJNZ R2,SHFTR1
0763 83           1236         RET
0764 27           1237 CLRDAT: CLR A
0765 A0           1238 LOADA:  MOV @R0,A
0766 18           1239         INC R0
0767 EA65         1240         DJNZ R2,LOADA
0769 83           1241         RET
076A F8           1242 ROMRD:  MOV A,R0
076B 97           1243         CLR C
076C F7           1244         RLC A
076D A8           1245         MOV R0,A
076E F8           1246 ROMIN:  MOV A,R0
076F 43C0         1247         ORL A,#0C0H
0771 39           1248         OUTL P1,A;         SET ADDRESS
0772 F482         1249         CALL INDAT
0774 A1           1250         MOV @R1,A
0775 8901         1251         ORL P1,#01H;       INC ADDRESS
0777 F482         1252         CALL INDAT
0779 47           1253         SWAP A
077A 41           1254         ORL A,@R1
077B A1           1255         MOV @R1,A
077C 19           1256         INC R1
077D 18           1257         INC R0
077E 18           1258         INC R0
077F EA6E         1259         DJNZ R2,ROMIN
```

APPENDIX I

```
LOC  OBJ          LINE          SOURCE STATEMENT

0781 83           1260           RET
0782 27           1261 INDAT;    CLR A
0783 987F         1262           ANL BUS,#07FH
0785 0A           1263           IN A,P2
0786 8880         1264           ORL BUS,#080H
0788 530F         1265           ANL A,#0FH
078A 83           1266           RET
078B F9           1267 ROMWRT;   MOV A,R1
078C 97           1268           CLR C
078D F7           1269           RLC A
078E A9           1270           MOV R1,A
078F F9           1271 ROMOUT;   MOV A,R1
0790 43C0         1272           ORL A,#0C0H;       SET ADDRESS
0792 39           1273           OUTL P1,A
0793 F0           1274           MOV A,@R0
0794 F4A4         1275           CALL OUTDAT
0796 8901         1276           ORL P1,#01H;       INC ADDRESS
0798 F0           1277           MOV A,@R0
0799 47           1278           SWAP A
079A F4A4         1279           CALL OUTDAT
079C 19           1280           INC R1
079D 19           1281           INC R1
079E 18           1282           INC R0
079F EAA2         1283           DJNZ R2,ROMOJ
07A1 83           1284           RET
07A2 E48F         1285 ROMOJ;    JMP ROMOUT;        ###################################################
07A4 53BF         1286 OUTDAT;   ANL A,#0BFH;       LATCH ACCUMULATOR LOW 4 BITS TO EAROM
07A6 43B0         1287           ORL A,#0B0H;       WITHOUT DISTURBING OTHER PORT LINES
07A8 3A           1288           OUTL P2,A
07A9 98DF         1289           ANL BUS,#0DFH;     MAKE SURE WRITE LINE IS LOW
07AB 987F         1290           ANL BUS,#07FH;     TOGGLE CHIP SELECT
07AD 00           1291           NOP
07AE 8880         1292           ORL BUS,#080H;     RESET CHIP SELECT
07B0 8820         1293           ORL BUS,#020H;     RESET WRITE LINE
07B2 83           1294           RET
07B3 B800         1295 DEBONC;   MOV R0,#00H;       3.24 MILLISECOND SWITCH DEBOUNCE TIMER ROUTINE
07B5 B905         1296           MOV R1,#05H
07B7 E8B7         1297 DEB01;    DJNZ R0,DEB01
07B9 E9B7         1298           DJNZ R1,DEB01
07BB 83           1299           RET
07BC 23FF         1300 DBTST;    MOV A,#0FFH
07BE 97           1301           CLR C
07BF A7           1302           CPL C
07C0 BA24         1303           MOV R2,#24H
07C2 C441         1304           JMP DISP1
07C4 8840         1305 TURNON;   ORL BUS,#40H;            TURN ON XD2210
```

APPENDIX I

```
LOC  OBJ                SOURCE STATEMENT
07C6 BA05                  MOV R2,#05H
07C8 F4B3          SETTLE: CALL DEBONC
07CA EAC8                  DJNZ R2,SETTLE
07CC 83                    RET
07CD BA05          TRNOFF: MOV R2,#05H;              TURN OFF XD2210
07CF F4B3          SETTL1: CALL DEBONC
07D1 EACF                  DJNZ R2,SETTL1
07D3 88A0                  ORL BUS,#0A0H
07D5 89FF                  ORL P1,#0FFH
07D7 8A0F                  ORL P2,#00FH
07D9 98AF                  ANL BUS,#0AFH
07DB 83                    RET
                   ;------------------------------------------------------------------------
03D8                       ORG 3D8H;        DATA INITIALIZATION
03D8 C7            PRESET: DB 0C7H, 00DH, 01EH, 019H, 010H, 027H, 00AH, 000H
03D9 0D
03DA 1E
03DB 19
03DC 10
03DD 27
03DE 0A
03DF 00
03E0 0A                    DB 00AH, 000H, 003H, 00CH, 003H, 00CH, 003H, 00CH
03E1 00
03E2 03
03E3 0C
03E4 03
03E5 0C
03E6 03
03E7 0C
03E8                       ORG 3E8H; SEVEN SEGMENT LOOKUP TABLE  3E8-3FF
03E8 20                    DB 020H, 010H, 008H, 002H, 000H, 060H, 0D0H, 0E0H
03E9 10
03EA 08
03EB 02
03EC 00
03ED 60
03EE D0
03EF E0
03F0 7E                    DB 07EH, 018H, 0B6H, 0BCH, 0D8H, 0ECH, 0EEH, 038H
03F1 18
03F2 B6
03F3 BC
03F4 D8
03F5 EC
```

APPENDIX I

```
LOC   OBJ        LINE        SOURCE STATEMENT

03F6  EE
03F7  38
03F8  FE         1325         DB 0FEH, 0F8H, 0FAH, 0CEH, 066H, 09EH, 0E6H, 0F2H
03F9  F8
03FA  FA
03FB  CE
03FC  66
03FD  9E
03FE  E6
03FF  F2
                 1326 ;------------------------------------------------------------
                 1327         END

USER SYMBOLS
ADDUP  05A4  ADERRA 01B7  ADINC  0595  ADMULT 0199  ADV1   0104  ADV1J  00E3  ADV2   010A  ADV3   010E
ADVANC 00FF  ALPHA  06F4  AVRGC  01D5  AVRGD  01DD  AVRGE  01EB  AVRGF  01EC  BCDCLR 049B  BCDJ   0450
BCDLOD 04BF  BCDWC  04B6  BITHI  066F  BITLO  0663  CALBR1 020F  CALCNT 03B0  CALD   06E6  CALENT 009D
CALOVR 06EE  CALTA  020A  CALTST 01BE  CLEAR  0661  CLEAR1 0665  CLRDAT 0764  CLRZER 0443  CNTDSP 0369
COMP1  0655  COMP2  0657  COMP2S 0653  CONA   00FB  CONBCD 04AC  CONDSP 06C6  CONVRB 0435  CONVRC 0437
CONVRT 0429  CRUNCH 03C8  CUSPOS 02C8  CUSTOM 041D  D8TS   07BC  DAT1   0628  DATA1  0616  DATA2  0617
DATA2J 0626  DATADD 0614  DATINT 0048  DATMOV 062A  DATRDY 05C7  DATSAV 05B4  DEB01  07B7  DEBONC 07B3
DISP   0637  DISP1  0641  DISPLY 050C  DISPMS 0583  DISPOK 056B  DIV8   05E9  DIVA   067B  DIVB   069E
DIVC   06AE  DIVD   06B7  DIVDAT 0400  DIVIDE 0673  DIVRET 069D  DODSP  0713  DP1    055F  DP1DSP 0183
DP2    0563  DP2DSP 0187  DPSET  0158  DWTRNG 0146  EIGHTS 066D  ERDISP 06DE  ERRGO  01BA  ERRSUB 02D0
GETX   023A  GETZ   0221  GETZ1  024B  GRAMSA 014C  GRERR  02CE  GRMDSP 04FF  INCREM 0692  INDAT  0782
JWLRY  02BE  K3     050A  KSPAN  0254  LED01  056A  LEDOUT 0565  LED2A  051F  LED2B  0525  LED2C  0533
LED2D  0539  LEVON  04FA  LEVON1 04FB  LOADA  0765  MUL2X2 0718  MULA   0728  MULB   0737  NOCON  0341
NOERR  02DE  NOERRA 02E4  NOLIN  0296  NOLOB  0712  NOMIND 0557  NOMS   0582  NOOFF  0194  NOOFFJ 00DF
NORMJ  033F  NORML  02F4  NOTARE 00D0  NOTOZ  0417  NSTAB  0490  OFF    04C8  OFFA   04F6  OFFGO  00E5
OKOVR  05DE  OKSTAB 063E  OUTDAT 07A4  OVRERR 06D6  PARTAJ 0144  PARTBJ 0111  PARTSA 00E7  PARTSB 00F7
PAUSE  008F  PAUSEJ 01B5  PCCNT  06D2  PCDSP  06CE  PJ2    021F  PRESET 03D8  PROCES 030C  PROJ   02CC
PWRUP  0009  RANGE  0113  RANGEJ 00E1  REMINC 0696  RNGDEX 0189  RNGDJ  0138  RNGDSP 016A  RNGDUN 018E
ROMIN  076E  ROMOJ  07A2  ROMOUT 078F  ROMRD  076A  ROMWRT 078B  SEGTST 008B  SETAVG 0073  SETC1  037F
SETC2  0399  SETCNT 036D  SETCSM 012C  SETDP0 0157  SETDP1 014F  SETDP2 0153  SETDWT 013C  SETGRM 0148
SETIT  050B  SETJ   033D  SETOZ  015F  SETTL1 07CF  SETTLE 07C8  SEVSEG 0631  SHFTL1 0741  SHFTLJ 0748
SHFTR1 075D  SHFTR2 075C  SHIFTL 0740  SKIP1  0065  SOUT   0593  SPNTST 00A4  STAB0  047B  STAB0A 047C
STAB0B 0479  STAB1  0466  STAB1A 0483  STAB2  048B  STABL  0441  STABLE 0452  STABOK 054F  STBRET 0494
SUBB   074A  SUBB1  074C  TARCON 0343  TIMERR 059E  TIMINT 058C  TIMJ   056A  TIMOUT 0612  TRNOFF 07CD
TROUBL 037B  TSTB1  013A  TSTSET 0354  TURNON 07C4  WAITT1 00B8  WAIT25 00D8  XMIT   0648

ASSEMBLY COMPLETE,    NO ERRORS
```

We claim:

1. An electronic balance, comprising:

tranducer means for producing a first electrical signal containing analog information representation of the weight of an object being weighed by means of said balance;

analog-to-digital conversion means for producing a series of second signals comprising a series of width-modulated pulses representative of said analog data in said first signal and the information contained in each said pulse including an error, said errors being non-cumulative;

filter means for reducing display flutter by filtering several subsets of said pulses sequentially to produce a series of third electrical signals, each said third electrical signal being representative of the data contained in a corresponding said subset of pulses; said filter means comprising processor means programmed for adding a series of said pulses, reducing the sum of said series by a predetermined fraction, and adding to the reduced sum the total of a second series of said pulses, and reducing the new total by said fraction; each said series including the same number of said pulses, and each said subset of said pulses including several said series; and means for summing said third electrical signals to produce an output signal representative of said weight.

2. The balance of claim 1, wherein said processor means is programmed to indicate whether a predetermined degree of stabilty in the measured weight of an object being weighed with said balance has been attained.

3. The balance of claim 2, wherein said processor means is programmed to indicate that said degree of stability has been attained only if the difference between each two consecutive series totals is less than a predetermined value for three consecutive said series.

4. The balance of claim 1, further comprising:

weight display means;

tare means; and processor means programmed to process said first electric signal to produce second electric signals for controlling said display means, and said processor means being programmed to operate said balance in a parts counting mode, wherein said second electric signals are for controlling said display means to indicate the number of pieces in a sample; and said processor means being programmed to generate said second electric signals only if said balance has been tared to account for the weight of a container to be used to hold said sample.

5. An electronic balance, comprising:

transducer means for producing a first electrical signal containing analog information representative of the weight of an object being weighed by means of said balance;

analog-to-digital conversion means for producing a series of second signals comprising a series of width-modulated pulses representative of said analog data in said first signal and the information contained in each said pulse including an error, said errors being non-cumulative; said analog-to-digital conversion means comprising difference amplifier means for producing an intermediate signal representative of said weight, switch means and a voltage source for producing a feedback signal comprising a series of pulses of varying width, integrator means for integrating the sum of said intermediate signal and said feedback signal to produce said pulses, the width of said pulses being proportional to said weight, comparator means for generating a signal only when the magnitude of the output of said integrator means exceeds a predetermined value, and clock pulse timer means for initiating said feedback pulses at equal time intervals by activating said switch means; said comparator means also being for turning off said switch means one clock pulse after said integrator means output beings to exceed said predetermined value;

filter means for reducing display flutter by filtering several subsets of said pulses sequentially to produce a series of third electrical signals, each said third electrical signal being representative of the data contained in a corresponding said subset of pulses; and means for summing said third electrical signals to produce an output signal representative of said weight.

6. The balance of claim 5, further comprising:

means for converting said output signal into a fourth electrical signal representative of said weight expressed in one of a set of predetermined units;

means for selecting one of said set of units; and non-volatile electronic memory means for storing conversion factors for converting said output signal into said fourth electrical signal.

7. The balance of claim 5, further comprising span calibration means comprising a non-volatile memory means for storing information representative of the value of the full scale range of said balance for use in establishing a fourth electrical signal; means for establishing a fixed value by comparing said fourth electrical signal representative of said full scale range with the output signal produced by placing a known weight corresponding to said full scale range on said balance; means for storing said fixed value; and means for comparing said fixed value to the output signal representative of the weight of an object whose weight is to be determined to produce a calibrated output signal representative of said weight as a fraction of said full scale range.

8. The balance of claim 5, further comprising:

weight display means;

processor means programmed to process said output signal to produce fourth electric signals for controlling said display means; and non-volatile memory means; and said processor means being programmed for storing said non-volatile memory means, before said balance is turned off, information representative of the operating status of said balance immediately before said balance is turned off.

* * * * *

UNITED STATES PATENT AND TRADEMARK OFFICE

CERTIFICATE OF CORRECTION

PATENT NO. : 4,525,794

DATED : June 25, 1985

INVENTOR(S) : Daniel G. Scheffer, Christopher W. Brock, Douglas B. Schumer

It is certified that error appears in the above-identified patent and that said Letters Patent is hereby corrected as shown below:

| Column | Line | |
|---|---|---|
| 9 | 9 | change "passes" to --pauses--. |
| 36 | after 490 | insert --02AC F418 491 CALL MUL2X2--. |
| 56 | after 936 | insert --05A4 B816 937 ADDUP: MOV R0,#16H--. |
| 78 | 18-19 | change "beings" to --begins--. |

Signed and Sealed this

Eleventh Day of August, 1987

*Attest:*

DONALD J. QUIGG

*Attesting Officer*

*Commissioner of Patents and Trademarks*